(12) United States Patent
Asinovski et al.

(10) Patent No.: US 8,106,636 B2
(45) Date of Patent: Jan. 31, 2012

(54) METHOD AND APPARATUS FOR POWER CONVERSION WITH WIDE INPUT VOLTAGE RANGE

(75) Inventors: Alexander Asinovski, Stoughton, MA (US); John Wanes, Toronto (CA); Isaac Ozkaynak, Milwaukee, WI (US); Milan Dragojevic, Natick, MA (US)

(73) Assignee: Murata Power Solutions, Mansfield, MA (US)

( * ) Notice: Subject to any disclaimer, the term of this patent is extended or adjusted under 35 U.S.C. 154(b) by 427 days.

(21) Appl. No.: 12/390,355

(22) Filed: Feb. 20, 2009

(65) Prior Publication Data
US 2009/0212758 A1    Aug. 27, 2009

Related U.S. Application Data

(60) Provisional application No. 61/030,635, filed on Feb. 22, 2008.

(51) Int. Cl.
*G05F 1/16* (2006.01)
*H02M 3/335* (2006.01)

(52) U.S. Cl. ..................... 323/258; 363/21.01

(58) Field of Classification Search ............ 363/16, 363/17, 20, 21.01, 21.04, 21.1, 21.12, 21.18; 323/255, 258
See application file for complete search history.

(56) References Cited

U.S. PATENT DOCUMENTS

| | | | |
|---|---|---|---|
| 4,916,329 A | | 4/1990 | Dang et al. |
| 5,155,672 A | * | 10/1992 | Brown ............................ 363/43 |
| 6,137,277 A | | 10/2000 | Rajda et al. |
| 6,208,534 B1 | * | 3/2001 | Shteynberg et al. ........ 363/21.04 |
| 6,239,993 B1 | * | 5/2001 | Fraidlin et al. ............. 363/56.03 |
| 6,288,913 B1 | | 9/2001 | White |
| 6,317,336 B1 | * | 11/2001 | Jiang et al. ....................... 363/16 |
| 6,320,764 B1 | * | 11/2001 | Jiang et al. ....................... 363/17 |
| 6,700,802 B2 | | 3/2004 | Ulinski et al. |
| 2005/0243580 A1 | | 11/2005 | Lyle, Jr. |

OTHER PUBLICATIONS

Official Communication issued in corresponding International Patent Application No. PCT/US2009/034802, mailed on Oct. 6, 2009.
Zhu et al., "Three-Level Switching Cell for Low Voltage/High-Current DC-DC Converters," IEEE Transactions on Power Electronics, Sep. 2007, vol. 22, No. 5, pp. 1997-2007.
Ruiz-Caballero et al., "A New Flyback-Current-Fed Push-Pull DC-DC Converter," IEEE Industrial Electronics Society, Sep. 1998, vol. 2, pp. 1036-1041.

* cited by examiner

*Primary Examiner* — Matthew Nguyen
(74) *Attorney, Agent, or Firm* — Keating, Bennett, LLP

(57) ABSTRACT

A power conversion system includes an input terminal that is arranged to be connected to a voltage source; a transformer having a first winding connected to the input terminal and a second winding connected to an output terminal of the power conversion system, either the first winding or the second winding is provided with at least three taps that are arranged to divide the first winding or the second winding into at least two sub-windings; at least one tap switch connected to the at least two sub-windings; a control circuit connected to the at least one tap switch; and at least one switch connected to the at least one tap switch. The control circuit is arranged to control the at least one tap switch to control the turn ratio of the transformer.

23 Claims, 24 Drawing Sheets

METHOD AND APPARATUS FOR POWER CONVERSION WITH WIDE INPUT VOLTAGE RANGE

BACKGROUND OF THE INVENTION

1. Field of the Invention

The present invention relates, in general, to switching mode power supplies and power conversion system, and in particular to methods and apparatuses for power conversion with wide input voltage range. The present invention can be used in a standalone converter or as part of a larger system. For example, one application of the present invention is to provide an apparatus that can increase the output voltage holdup time in off-line power supplies during a loss of input power.

2. Description of the Related Art

Power devices such as MOSFETs, for example, used in known switching mode power supplies (SMPS) and converters work as high frequency (typically hundreds of kilohertz) ON/OFF switches. In the ON state, the switch can conduct a relatively large current at near zero voltage across its terminals, resulting in a low power loss. In the OFF state, a relatively large voltage can be applied to the switch, but the current is near zero, resulting again in a very small power loss. Power losses during the ON/OFF transitions, also known as switching losses, can be reduced using conventional techniques. As a result, SMPS and power converters are widely used in telecommunications, industrial, and other applications because of their high efficiency and excellent thermal performance.

In order to have the output voltage regulated, the ratio of ON time of the power switches to the switching period, called duty ratio or duty cycle, is typically controlled by feedback circuitry. The duty cycle range required to keep output voltage constant is typically on the same order as the input voltage range. For example, the output voltage, $V_o$, of an ideal forward converter is proportional to the input voltage $V_{in}$ and to the duty cycle D and is inversely proportional to a turn ratio TR of a power transformer (the number of primary turns divided by the number of secondary turns):

$$V_0 = \left(\frac{V_{in}}{TR}\right) \times D.$$

To ensure that the output voltage is regulated in the full input voltage range $V_{in\,max}/V_{in\,min}$, the duty cycle range $D_{max}/D_{min}$ based on the equation above must be equal to the voltage range:

$$\frac{D_{max}}{D_{min}} = \frac{V_{in\,max}}{V_{in\,min}}.$$

Because the minimum pulse width is limited in practice, the input voltage range is limited. For example, if the switching frequency is 250 kHz and $D_{max}=50\%$, then the maximum ON time is 2 µs. If the minimum ON time is 0.5 µs, then $D_{min}$=(minimum ON time)/(switching period)=0.5/4 or 12.5%. Thus, the voltage input range is limited to $V_{in\,max}/V_{in\,min}=D_{max}/D_{min} \leq (50/12.5)=4$.

When a wider input voltage range is required, a different technique must be used. One conventional technique is to reduce the switching frequency that is associated with the larger magnetic components. This results in larger filters and consequently larger converter sizes. Another known technique is shown in FIG. 1. The block diagram shown in FIG. 1 includes N power converters connected in parallel on input and output sides. Each of the power converters covers a relatively narrow input voltage range, and the rest of power converters are off in that particular range. Consider for example a parallel structure of three power converters connected according to FIG. 1, with $V_{in\,min}=9$ V, $V_{in\,max}=72$ V. Let the first power converter be active in the 9 V to 18 V input voltage range, the second power converter be active in the 18 V to 36 V input voltage range, and the third power converter be active the in 36 V to 72 V input voltage range. In this particular example, the parallel combination of the three power converters covers the input voltage range $V_{in\,max}/V_{in\,min}$ equal to 72 V/9 V=8, while each power converter only works in the range equal to 18 V/9 V=36 V/18 V=72 V/36 V=2.

An advantage of this known parallel structure is high efficiency because each power converter can be optimized in a relatively narrow input range. A disadvantage of this known parallel structure is an increased number of power converters, where each power converter is designed for full power, which leads to increased size and cost of the power conversion system.

The above demonstrate that there is an unmet need in the field for a more effective method and apparatus suitable for power conversion with wide input voltage range.

SUMMARY OF THE INVENTION

In view of the above, preferred embodiments of the present invention provide a power conversion system that includes an input terminal that is arranged to be connected to a voltage source; a transformer having a first winding connected to the input terminal and a second winding connected to an output terminal of the power conversion system, either the first winding or the second winding is provided with at least three taps that are arranged to divide the first winding or the second winding into at least two sub-windings; at least one tap switch connected to the at least two sub-windings; a control circuit connected to the at least one tap switch; and at least one switch connected to the at least one tap switch. The control circuit is arranged to control the at least one tap switch to control the turn ratio of the transformer.

The at least one switch preferably includes one switch that is connected to each of the at least one tap switch. The at least one tap switch preferably includes a plurality of tap switches, and the at least one switch preferably includes a plurality of switches that are each connected to a corresponding one or corresponding ones of the plurality of tap switches. The at least one tap switch is preferably connected between the transformer and the at least one switch. The at least one switch is preferably connected between the transformer and the at least one tap switch. The at least one tap switch is preferably connected to the secondary winding, and one of the at least one switches is preferably connected to the primary winding.

The control circuit is preferably arranged to receive an input signal that is based on an input voltage and to receive a synchronization signal that is synchronized with an output signal of a pulse modulator.

A power conversion system according to a preferred embodiment of the present invention preferably further includes a signal secondary winding that provides the input signal that is based on an input voltage. Preferably, the at least one tap switch includes at least two tap switches, and when the current through the at least two windings is zero or near zero, the control circuit is arranged to first turn off one of the at least two tap switches and then to later turn on another of the at least two tap switches to control the turn ratio of the transformer.

The at least one switch is preferably a MOSFET. The at least one tap switch is preferably a MOSFET. The at least one tap switch is preferably a series combination of two MOSFETs with common sources and gates.

A power conversion system according to a preferred embodiment of the present invention preferably further includes a diode connected to a center tap of the secondary winding.

A power conversion system according to a preferred embodiment of the present invention preferably further includes a switch connected between the input terminal and the transformer. The input terminal is preferably connected to a center tap of the primary winding. The output terminal is preferably connected to a center tap of the secondary winding. The control circuit preferably includes at least one window comparator arranged to determine which voltage subrange that an input voltage is in. The control circuit preferably includes a tap winding zero current detector. The at least one switch preferably includes four switches arranged in a full-bridge arrangement. The at least one switch preferably includes two switches arranged in a half-bridge arrangement.

The power conversion system according to a preferred embodiment of the present invention preferably further includes a pulse modulator connected to the at least one switch.

The power conversion system according to a preferred embodiment of the present invention preferably supplies either DC power or AC power.

Other features, elements, steps, characteristics, aspects and advantages of the present invention will become more apparent from the following detailed description of preferred embodiments with reference to the attached drawings.

DETAILED DESCRIPTION OF PREFERRED EMBODIMENTS

Figure 1:
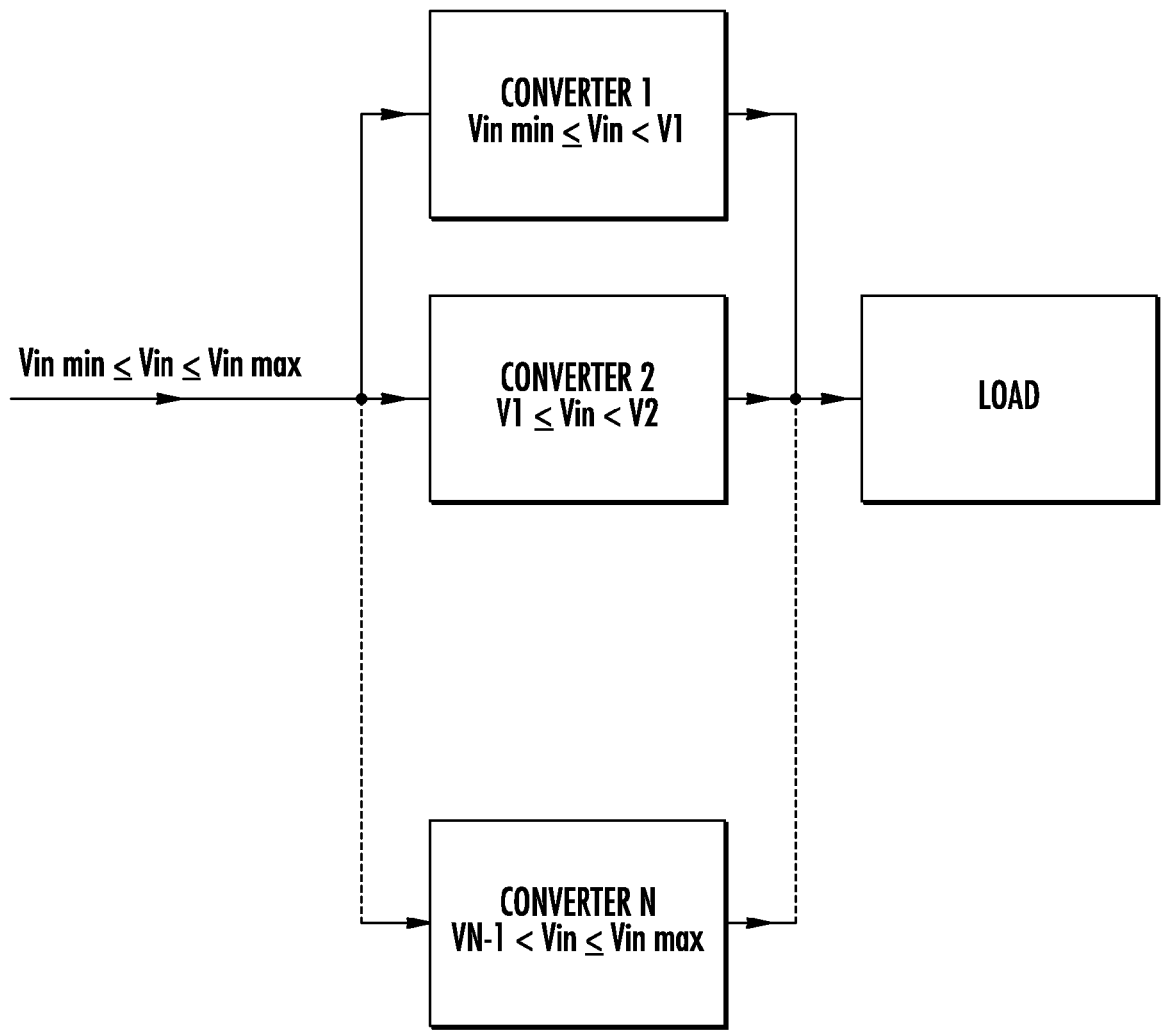
FIG. 1 shows a block diagram of a prior art converter system including N converters connected in parallel, each of which works in a relatively narrow input voltage range.

Preferred embodiments of the present invention will be described with respect to FIGS. 2-17.

According to preferred embodiments of the present invention, both the duty ratio, D, and turns ratio, TR, of the power transformer are controlled. The input voltage range $v = V_{in\,max}/V_{in\,min}$ is divided into N sub-ranges (or subintervals) in such a way that $TR=TR_i$ (i=1, 2, ..., N—where N is the number of sub-ranges) is constant within each sub-range. Typically, all of the sub-ranges (a ratio between the maximum, $V_{i\,max}$, and the minimum, $V_{i\,min}$, input voltages within a sub-range number i) are selected equally such that:

$$\frac{V_{i\,max}}{V_{i\,min}} = K = v^{\frac{1}{N}}.$$

For buck derived topologies, because TR is constant within each sub-range, a sub-range is equal to the duty cycle range $d=D_{max}/D_{min}$:

$$K = v^{\frac{1}{N}} = d,$$

consequently, $$N = LOG_d(v) = \frac{\text{LOG }(v)}{\text{LOG }(d)}.$$

At low input voltages, within the first sub-range, the turns ratio TR is set at minimum ($TR=TR_{min}$); at medium input voltages, the turns ratio TR is set higher; and at high input voltages, the turns ratio TR is set at maximum ($TR=TR_{max}$):

$$TR_i=TR_{min} \times K^{i-1}, i=1,2,\ldots, N.$$

Maximum, $D_{max}$, and minimum, $D_{min}$, duty cycles are the same for all sub-ranges. At the low side of each sub-range, $D=D_{max}$, and at high side of each sub-range, $D=D_{min}$. A transition from one TR to another TR is accomplished in a time interval during which the tap winding is disconnected or is nearly disconnected from the power train (the time during which the current through the tap winding section is zero or near zero), in the following manner. As the input voltage crosses a borderline between two adjacent sub-ranges, the control circuitry starts searching for a proper time interval mentioned above, for example, a freewheeling time interval for a forward topology or dead time interval for double-ended buck derived topologies, and a corresponding transformer winding section is physically disconnected from the power train by a corresponding tap switch. Then, typically in a matter of a few hundred nanoseconds, during the same or next similar time interval, another combination of winding sections is connected to the power train, providing a soft transition from one TR value to another TR value. This soft transition approach ensures an uninterruptible load power and avoids undesirable transients potentially associated with TR control.

Ideally, this soft transition occurs when there is no current flowing through the tap winding, i.e. zero current. However, practically, even when the current path from the input voltage source through the tap windings is interrupted such that no current from the input voltage source can flow through the tap windings, some small current, i.e. near zero current, might flow in the tap windings because of parasitic components or because of small magnetizing currents (non-load currents). That is, in some cases, it is impossible to make this soft transition at zero current because of the current flow caused by the parasitic components and small magnetizing currents. In which case, the soft transition must be made at near zero current, when the only current is caused by parasitic components and the small magnetizing currents. If current is flowing from the input voltage source through the tap windings during this transition, then undesirable large transients are created. It is preferable that these large transients be avoided.

The technique of controlling both the duty cycle and the turns ratio has three advantages compared with the conventional technique of only controlling the duty cycle, where TR is constant over the whole input voltage range. First, the minimum duty cycle and the minimum pulse width are extended. Second, the root mean square (RMS) current and power losses on the primary side of the power transformer are reduced at high input voltage, which results in a converter with a higher efficiency. Third, the voltage stress at the secondary switches is reduced, which allows the use of lower voltage rated switches, which results in lower power losses at the secondary side and in higher efficiency.

As an example, a forward converter has a $V_{in\ min}=18$ V, $V_{in\ max}=162$ V (9 times range), and $V_o=12$ V. If $TR_{min}=1$, $D_{max}=66.7\%$, $D_{min}=22.2\%$, then $d=66.7/22.2=3$ and the number of sub-ranges is $N=LOG_3\ 9=2$ and the sub-range is $\sqrt{v}=\sqrt{9}=3$. That is, the first input voltage sub-range is 18 V to 54 V (3 times) and the second input voltage sub-range is 54 V to 162 V (also 3 times). In order to maintain the same $D_{max}$ at the low side of the second range (where $V_{in}$ is close to 54 V), the turns ratio TR within that sub-range is equal to: $TR_{max}=(54/12)*0.667=3$. The minimum duty cycle at high input voltage is $V_o*TR_{max}/V_{in}=12*3/162=0.222$. The turns ratio TR within the first voltage range $18\ V \leq V_{in} < 54\ V$ is equal to $TR_{min}=1$, and the duty ratio deviates from 66.7% at $V_{in\ min}=18$ V to 22.2% at the high end of the first sub-range (close to 54 V); the turns ratio TR within the second voltage range $54 < V_{in} \leq 162$ V is equal to $TR_{max}=3$, and the duty ratio deviates in the same range from 66.7% at the low end of the second sub-range (close to 54 V) to 22.2% at high end $V_{in\ max}=162$ V.

The soft transition from $TR_{min}=1$ to $TR_{max}=3$ is accomplished at $V_{in}=54$ V during the freewheeling time interval. The conventional technique with fixed turns ratio requires three times the duty cycle ratio range: $D_{max}/D_{min}=V_{in\ max}/V_{in\ min}=9$. Using conventional techniques, the peak primary current at high voltages with fixed TR=1 and $D_{min}=D_{max}/(V_{in\ max}/V_{in\ min})=D_{max}/9=66.7\%/9=7.4\%$ is $I_o/TR=I_o$, and RMS² is $(I_o/TR)^2*D_{min}=I_o^2*D_{max}/9=I_o^2*0.074$.

In contrast, for converters based on forward topology according to a preferred embodiment of the present invention with TR control, $RMS^2=(I_o/TR_{max})^2*D_{min}=I_o^2*0.0247$. The ratio between new and conventional RMS² values for the current example is equal to 3, i.e., power losses on the primary side of the power transformer are reduced by a factor of 3. In more general cases, the losses on the primary side of the power transformer associated with the RMS current for a buck derived converter with combined D and TR control having N input voltage sub-ranges are reduced by a factor of:

$$\frac{v}{v^{\frac{1}{N}}} = v^{\left(\frac{N-1}{N}\right)}$$

which is the ratio between the whole input range v and a sub-range K value. For the above example with N=2, this equation reduces to $\sqrt{v}$. Because the turns ratio TR at high input voltage is increased by a factor of 3, the voltage stress on the secondary side freewheeling rectifier is reduced by a factor of 3, which allows for the use of a better freewheeling rectifier and which provides further efficiency improvement. In a more general case, for a forward converter with combined D and TR control having N input voltage sub-ranges, a voltage stress on the secondary side rectifiers during forward time is reduced by the same factor:

$$v^{\left(\frac{N-1}{N}\right)}.$$

If the number of sub-ranges is large, N>>1, then K is approximately 1 (very narrow sub-ranges), d is approximately 1 (duty cycle is near constant, $D_{max}$ and $D_{min}$ are near equal), and the primary losses and the voltage stress on the secondary side are reduced by a factor of v. In other words, the voltage on the secondary side during forward time intervals stays constant, independently of the line voltage. The theoretical case of unlimited N corresponds to continuous TR control with a constant duty cycle, in contrast with a constant TR, within each sub-range, TR and continuous D control with relatively small N. The optimal number of sub-ranges, $N_{opt}$, providing minimum complexity is determined by the required input voltage range v and the maximum achievable duty cycle range $d_{opt}=K_{opt}$. For buck derived topologies:

$$N_{opt} = \frac{\text{LOG }(v)}{\text{LOG }(K_{opt})}.$$

Combined control of the duty cycle and the turns ratio can be applied to any switch mode power converter that includes a power transformer and that has time intervals during which the transformer windings are disconnected or are nearly disconnected from the power train. Various preferred embodiments include, but are not limited to, some popular topologies as shown in FIGS. 2-17, such as forward converter, flyback converter, push-pull converter, half-bridge converter, full-bridge converter with a power transformer tapped on the primary and the secondary sides of the power transformer. The following description provides specific details that illustrate various preferred embodiments of the present invention.

Figure 2:
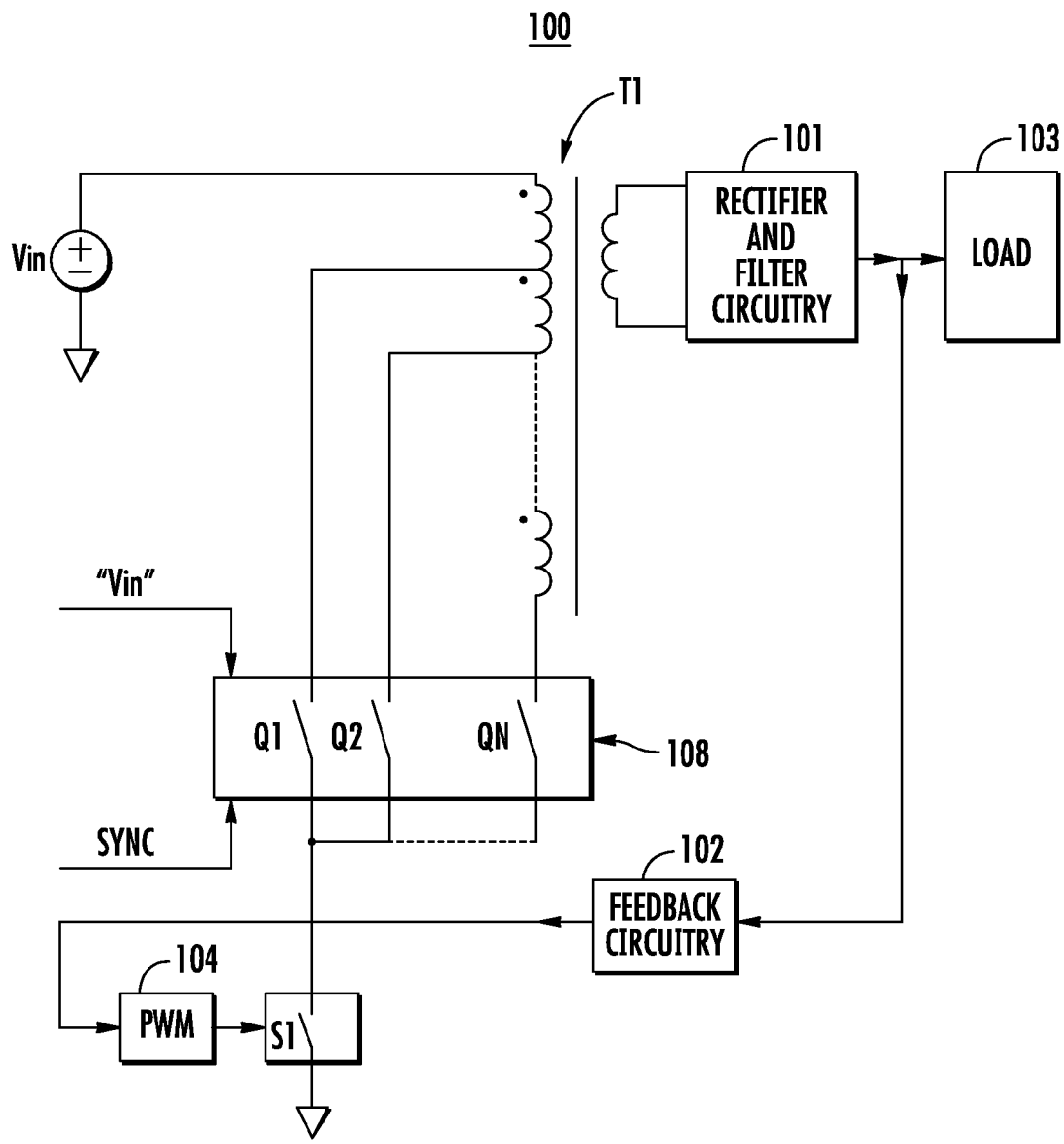
FIG. 2 shows a converter system according to a first preferred embodiment of the present invention that includes a forward or flyback converter with a single pulse width modulation (PWM) controlled main switch and multiple tap switches on the primary side of the power transformer that are controlled by the input voltage and a pulse signal synchronized with the PWM output.

FIG. 2 shows a converter system according to a first preferred embodiment of the present invention that includes a forward or flyback converter 100 with a single main switch S1 and multiple tap switches Q1, Q2, . . . , QN on the primary side of the power transformer T1. The secondary winding of the power transformer T1 is connected to the rectifier and the filter circuitry 101. The feedback circuitry 102 is connected to the load 103 and to the pulse width modulator (PWM) 104, the output of which controls the main switch S1. Although a PWM 104 is preferably used, it is also possible to use other suitable pulse modulators, e.g. pulse frequency modulators, pulse on-time modulators, etc., in this preferred embodiment of the present invention as well as the other preferred embodiments of the present invention.

The tap switches Q1, Q2, . . . , QN are preferably controlled by two signals: the analog signal "$V_{in}$" that is proportional to the input signal $V_{in}$ and the pulse signal SYNC that is synchronized with the PWM output. In this preferred embodiment as well as the other preferred embodiments, the tap switches Q1, Q2, . . . , QN are preferably controlled based in part upon the pulse signal SYNC. However, as explained below with respect to FIG. 17, it is also possible to not use the pulse signal SYNC and instead to use a signal based upon the actual current flowing in the winding to which the tap switches Q1, Q2, . . . , QN are connected.

The converter system in FIG. 2 operates in the following manner. The main switch S1 cycles ON/OFF at relatively high frequency (typically, hundreds of kilohertz) with a duty cycle defined by the feedback circuitry 102 and the PWM 104. The pulse width modulated AC voltage on the secondary side of the power transformer T1 is applied to the rectifier and the filter circuitry 101 that converts the voltage to a DC output voltage. Each tap switch Qi is ON only in one input voltage sub-range:

$$\frac{V_{i\ max}}{V_{i\ min}} = K = \left(\frac{V_{in\ max}}{V_{in\ min}}\right)^{\frac{1}{N}}$$

while all other tap switches are kept OFF in that specific voltage sub-range.

At low input voltages, the tap switch Q1 is ON while tap switches Q2, Q3, ..., QN are OFF so that only the top section of the winding of the power transformer T1 is connected to the main switch S1 (through tap switch Q1) and the turns ratio of the power transformer T1 is set at the minimum ratio. As the input voltage crosses the borderline between, e.g., the first and the second voltage sub-ranges, the control circuitry 108, based on the pulse signal SYNC that is synchronized with the PWM output, starts searching for a time interval corresponding to the OFF state of main switch S1 and generates control signals that first switches the tap switch Q1 to the OFF state and then switches the tap switch Q2 to the ON state after a small delay during the same or next OFF state of main switch S1. Because during the OFF time interval of the main switch S1 the energy flow from the input source is interrupted (load current is supplied by the output filter), the primary winding of the power transformer T1 only carries a small magnetizing current, which results in a soft (near zero current) transition from one turns ratio (e.g., one top winding section) to another turns ratio (e.g., two top winding sections). As explained above, the duty cycle at the low end of each voltage sub-range is automatically set at the maximum achievable level, the minimum pulse width is extended, and the voltage stress on the secondary side of the power transformer T1 and the RMS current on the primary side of the power transformer T1 are reduced at high (and nominal) line voltages, which results in greater efficiency in the converter system.

Figure 2A:
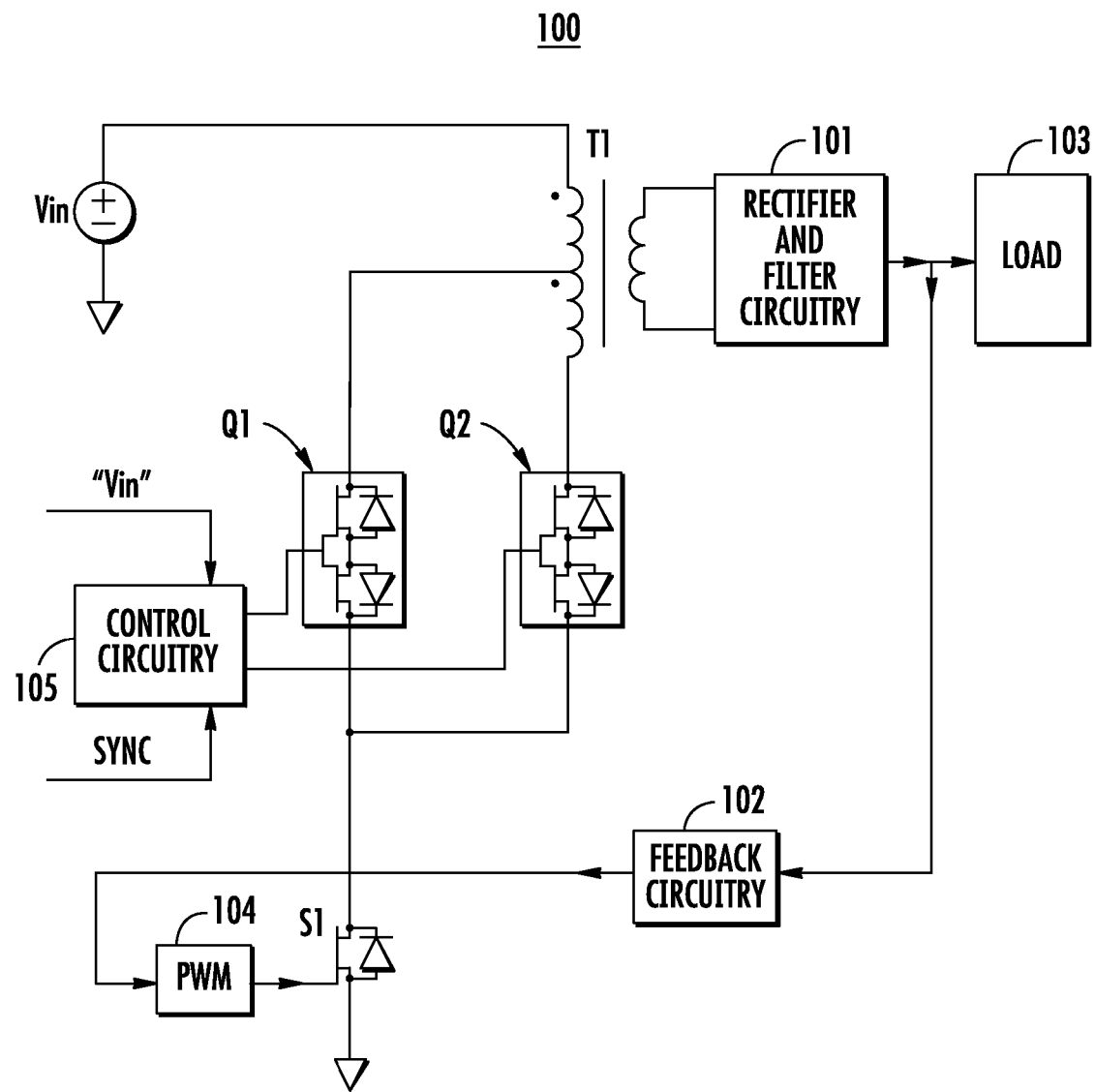
FIG. 2A shows a converter system according to a second preferred embodiment of the present invention that includes a forward or flyback converter with a single PWM controlled main MOSFET, a power transformer with a center tap, and two tap switches that are controlled by the input voltage and the pulse signal synchronized with the PWM output.

FIG. 2A shows a converter system according to a second preferred embodiment of the present invention. The converter system in this preferred embodiment uses a center tap modification of the converter system shown FIG. 2 and includes a forward or a flyback converter arrangement with a single main switch S1, a power transformer T1 with a center tap, and two tap switches Q1 and Q2 connected to control circuitry 105. The secondary winding of the power transformer T1 is connected to the rectifier and filter circuitry 101. The feedback circuitry 102 is connected to the load 103 and to the PWM 104. The output of the PWM 104 controls the main switch S1, which is preferably a MOSFET. Tap switches Q1, Q2 are preferably series combinations of two N-channel MOSFETs with common sources and gates controlled by the analog signal "$V_{in}$" that is proportional to the input signal $V_{in}$ and by the pulse synchronization signal SYNC that is synchronized with the PWM output. The converter system shown in FIG. 2A operates in a similar manner as the converter system in FIG. 2 and has two input voltage sub-ranges.

Figure 3:
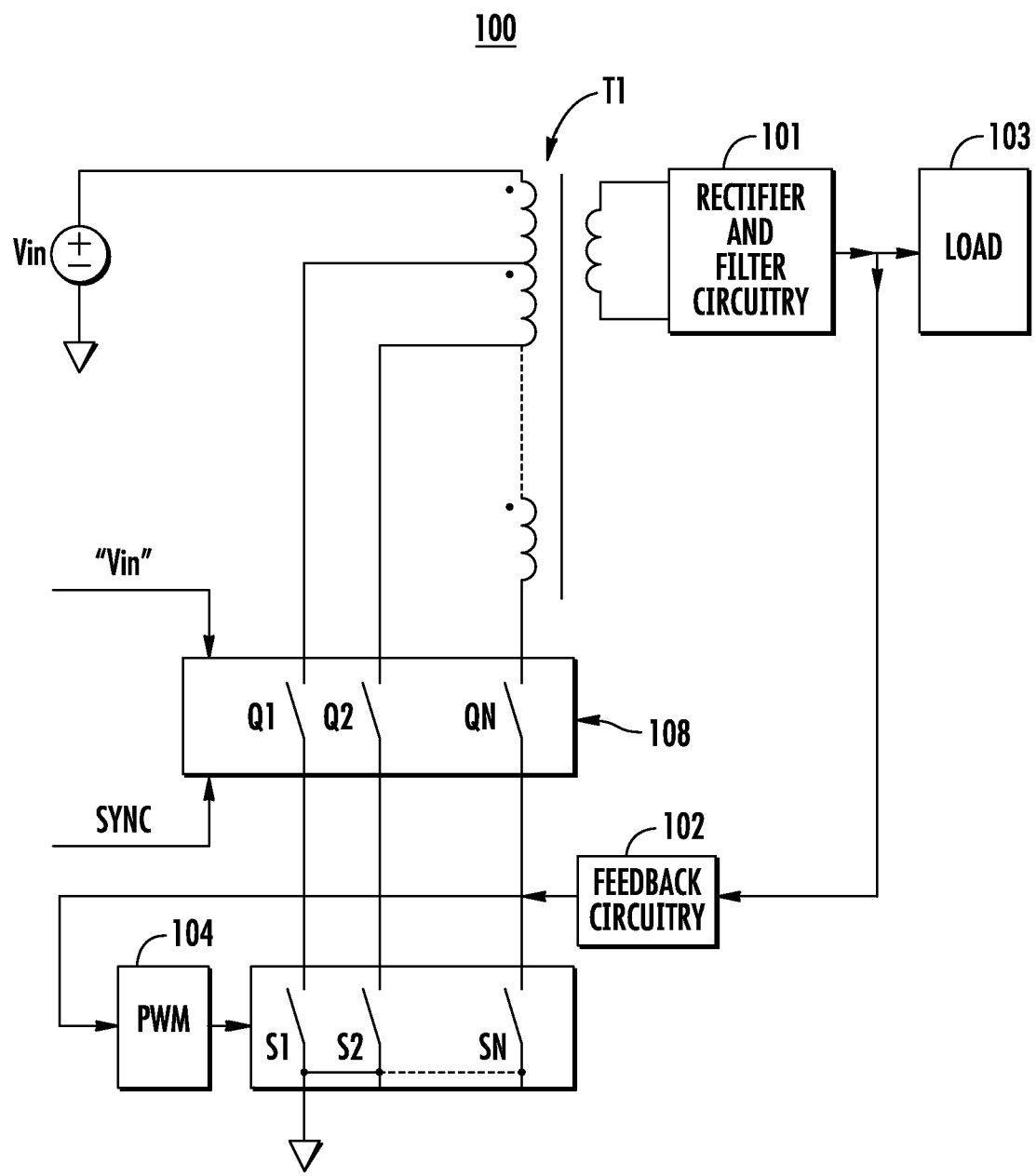
FIG. 3 shows a converter system according to a third preferred embodiment of the present invention that includes a forward or flyback converter with multiple PWM controlled main switches and multiple tap switches on the primary side of the power transformer that are controlled by the input voltage and a pulse signal synchronized with the PWM output.

FIG. 3 shows a converter system according to a third preferred embodiment of the present invention. The converter system in this preferred embodiment includes a forward or a flyback converter 100 that includes multiple main switches S1, S2, ..., SN that are controlled by the PWM 104 and includes multiple tap switches Q1, Q2, ..., QN that are controlled through the control circuitry 108 by the analog signal "$V_{in}$" and by the pulse synchronization signal SYNC. Tap switches Q1, Q2, ..., QN are connected to the taps of the power transformer T1 and to the corresponding main switches S1, S2, ..., SN. The secondary winding of the power transformer T1 is connected to the rectifier and filter circuitry 101, the output of which is connected to the load 103 and to the feedback circuitry 102, the output of which is connected to the input of PWM 104.

The converter system in FIG. 3 operates in a similar manner to the converter system in FIG. 2. The difference is that N main switches S1, S2, ..., SN are used in FIG. 3 instead of a single main switch S1 in FIG. 2. A tap switch Qi (i=1, ..., N) conducts primary current through a corresponding main switch Si. Preferably, S1, ..., SN are power MOSFETs. Main switch S1 in FIG. 2 must be selected to tolerate drain-to-source voltage at high input voltages. The relatively high voltage MOSFET having relatively large ON-resistance introduces excessive losses at lower input voltages. Power MOSFETs in FIG. 3 can be optimized (e.g., the voltage and/or the ON-resistance can be optimized) for each input voltage sub-range, which reduces main power losses and improves overall efficiency of the converter system.

Figure 3A:
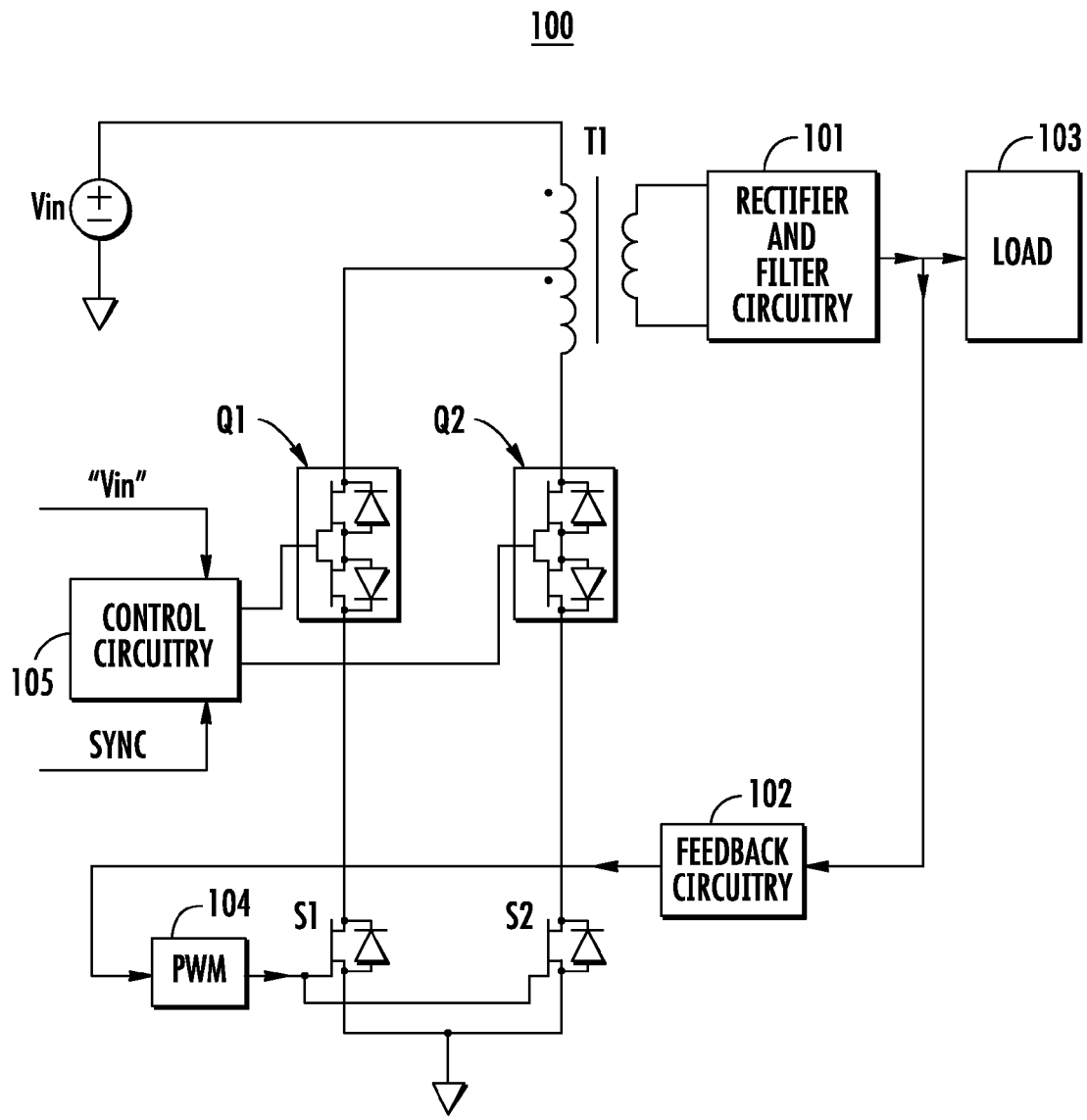
FIG. 3A shows a converter system according to a fourth preferred embodiment of the present invention that includes a forward or flyback converter with two PWM controlled main MOSFETs, a power transformer with a center tap, and two tap switches that are controlled by the input voltage and a pulse signal synchronized with the PWM output.

FIG. 3A shows a converter system according to a fourth preferred embodiment of the present invention. The converter system in this preferred embodiment uses a center tap modification of the converter system shown in FIG. 3 and includes two main switches S1, S2 and two tap switches Q1, Q2, which are preferably N-channel power MOSFETs, connected to control circuitry 105. The forward or flyback converter 100 in FIG. 3A also includes a power transformer T1, a rectifier and filter circuitry 101, a load 103, a feedback circuitry 102, and a PWM 104. Tap switches Q1, Q2 are preferably configured similar to the tap switches Q1, Q2 in FIG. 2A.

Figure 3B:
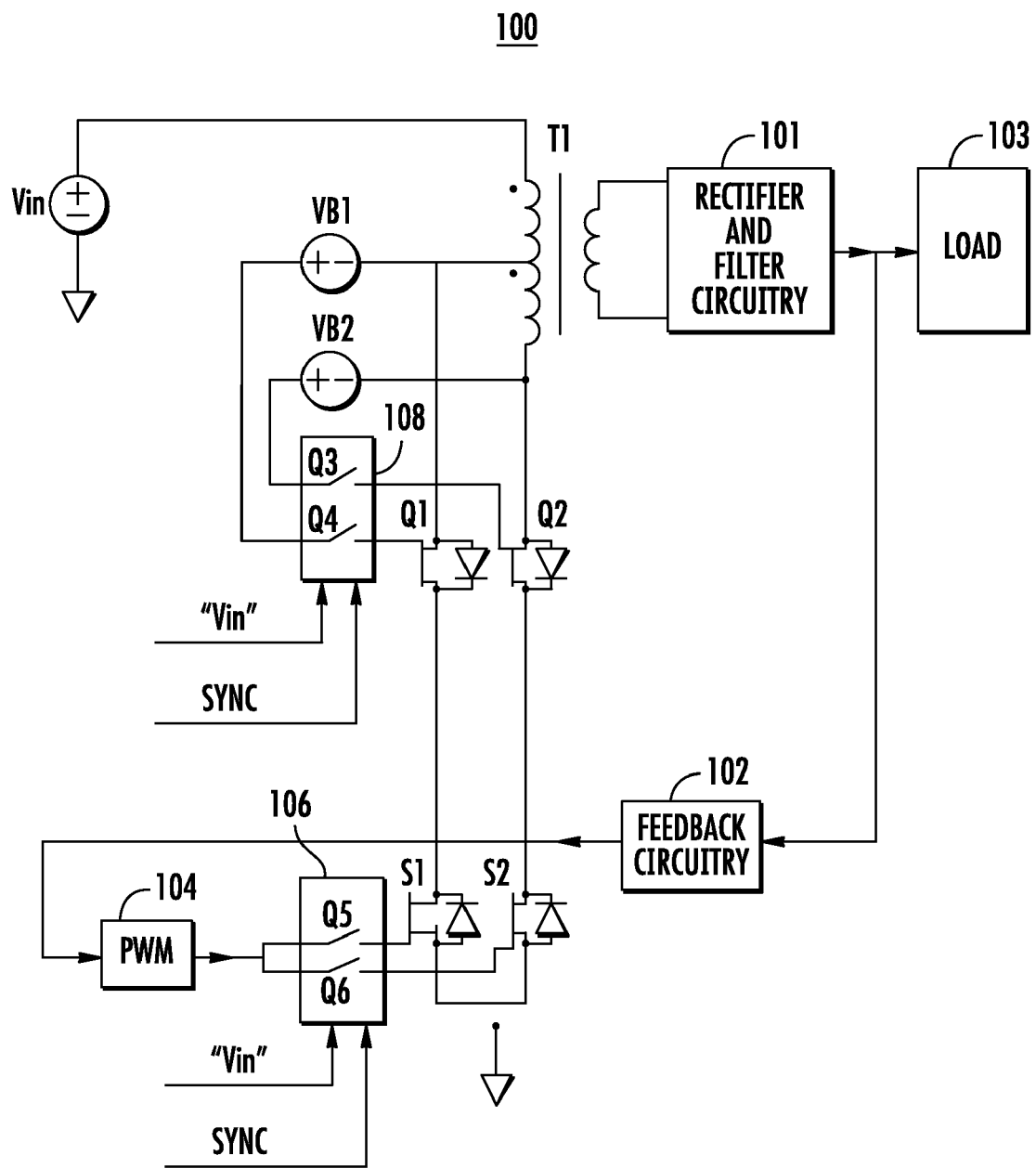
FIG. 3B shows a converter system according to a fifth preferred embodiment of the present invention that includes a forward or a flyback converter with two main PWM controlled MOSFETs, a power transformer with a center tap, two tap switches, and four low-power switches.

FIG. 3B shows a converter system according to a fifth preferred embodiment of the present invention. The converter system in this preferred embodiment includes a modification of the converter shown in FIG. 3A with a reduced number of power MOSFETs. The forward or flyback converter 100 in FIG. 3B includes two main switches S1, S2 and two tap switches Q1, Q2, a rectifier and filter circuitry 101, a load 103, a feedback circuitry 102, and a PWM 104 connected in a similar arrangement as shown in FIG. 3A. This preferred embodiment also includes two bias voltage sources VB1, VB2, two signal switches Q3, Q4 connected to control circuitry 108, and two signal switches Q5, Q6 connected to control circuitry 106. In contrast to the converter system shown in FIG. 3A, tap switches Q1 and Q2 shown in FIG. 3B are preferably single N-channel MOSFETs. Bias supply VB1 is connected to the central tap of the primary winding of the power transformer T1 and to the first terminal of the signal switch Q4, the second terminal of which is connected to the gate of the tap switch Q1. Similarly, bias supply VB2 is connected to the lower (undotted) end of the primary winding of the power transformer T1 and to the first terminal of the signal switch Q3, the second terminal of which is connected to the gate of the tap switch Q2. The first terminals of signal switches Q5, Q6 are connected to the gates of the main switches S1 and S2, respectively, and the second terminals of signal switches Q5, Q6 are connected to each other and to the output of PWM 104.

The converter system in FIG. 3B operates in the following manner. At low input voltages, signal switches Q4, Q5 are kept in the ON state and signal switches Q3, Q6 are kept in the OFF state, and a bias voltage VB1 is applied to the gate of the tap switch Q1 through the closed signal switch Q4, and the tap switch Q1 is kept in the ON state. Because signal switches Q3 and Q6 at low input voltages are kept in the OFF state, tap switch Q2 and main switch S2 are also kept OFF. Main switch S1 at low input voltages cycles ON/OFF with a duty ratio defined by the feedback circuitry 102 and the PWM 104.

Only the top section of the power transformer T1 is connected to the power train at low input voltages, and the turns ratio is set at the minimum ratio. As the input voltage crosses the borderline between the first and the second input voltage sub-ranges (i.e., the analog signal "$V_{in}$" reaches a predetermined level), both of the control circuitries 105 and 106, using the pulse synchronization signal SYNC that is synchronized with the PWM output, start searching for a time interval when the PWM output is LOW (i.e., the OFF state of the switch S1) and generate control signals that first switch signal switches Q4, Q5 to the OFF state. Consequently, the tap switch Q1 switches OFF and the main switch S1 is kept OFF. Then after a small delay, typically a few hundred nanoseconds, for example, during the same or the next time interval corresponding to the LOW level of the PWM output, the signal switches Q3, Q6 turn ON, tap switch Q2 turns ON, and the main switch S2 receives the control signal from the PWM 104. The full primary winding is connected to the power train through the tap switch Q2 and the turns ratio is set at the maximum ratio.

Commutation from one turns ratio to another turns ratio is performed in a time interval when the energy flow from input source is interrupted (i.e., during the OFF state of main switch S1 if the input voltage goes from low-to-high or during the OFF state of the main switch S2 if the input voltage goes from high-to low) which results in a soft, near zero current transition. The converter system shown in FIG. 3B uses a reduced number of power MOSFETs compared with the converter system shown in FIG. 3A: four power MOSFETs used in FIG. 3B versus six power MOSFETs used in FIG. 3A.

Figure 4:
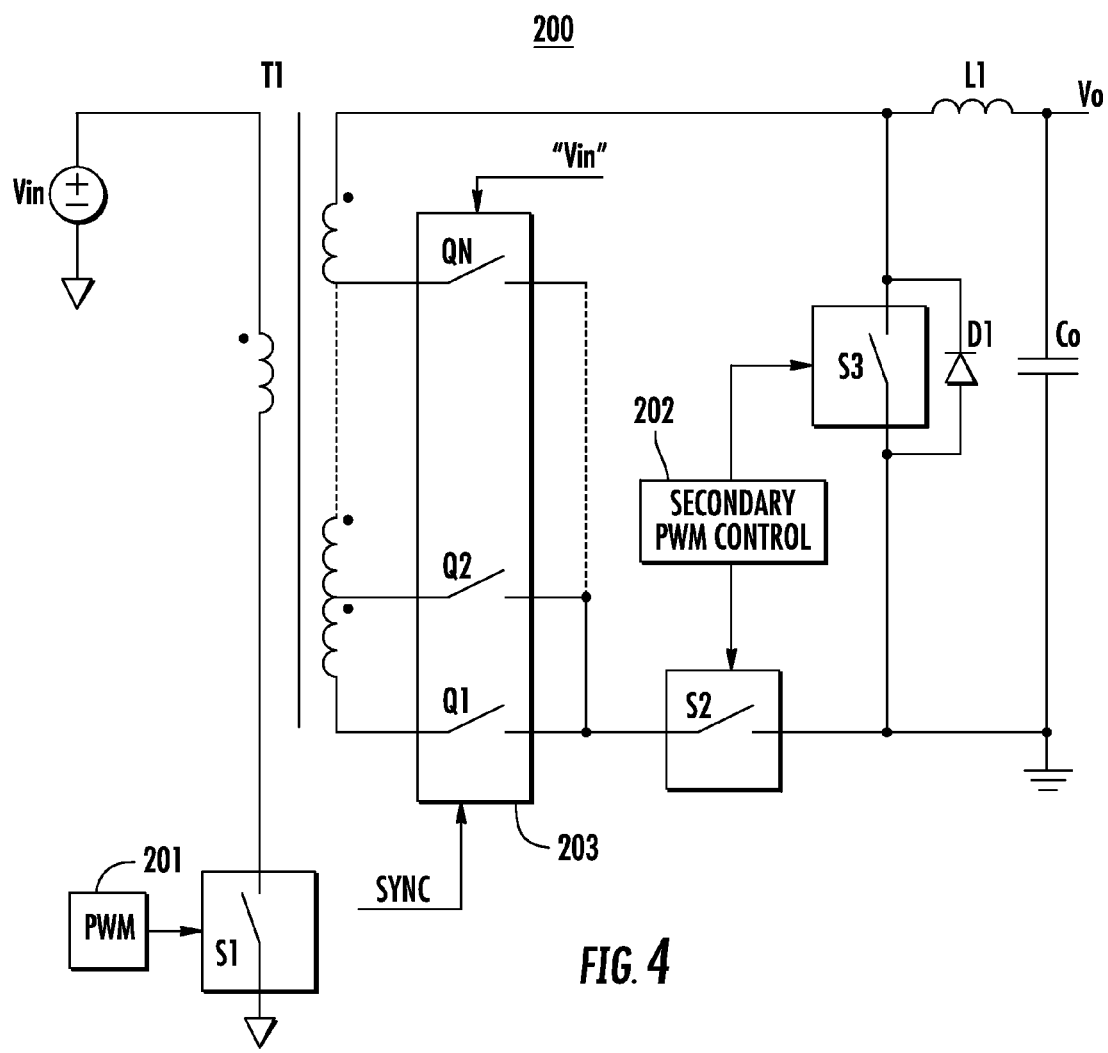
FIG. 4 shows a converter system according to a sixth preferred embodiment of the present invention that includes a forward converter with single PWM controlled forward switch on the secondary side of the power transformer and multiple tap switches that are controlled by the input voltage and a pulse signal synchronized with the PWM output.

FIG. 4 shows a converter system according to a sixth preferred embodiment of the present invention that includes a forward converter 200 with a single main switch S1 on the primary side of the power transformer T1, a PWM 201 connected to the main switch S1, a single forward switch S2 on the secondary side of the power transformer T1, a freewheeling switch S3 with an anti-parallel diode D1, a secondary PWM control circuitry 202, output inductor L1, output capacitor Co, and multiple secondary side tap switches Q1, ..., QN connected to control circuitry 203. With the exception of the tap switches Q1, ..., QN, the converter system shown in FIG. 4 is a forward converter with synchronous rectification.

At low input voltages, only the tap switch Q1 is in the ON state, the entire secondary winding is activated, and the turns ratio is set to the minimum ratio. As the input voltage crosses the borderline between the first and the second input voltage sub-ranges (i.e., the analog signal "$V_{in}$" reaches a predetermined level), the control circuitry 203, using the pulse synchronization signal SYNC that is synchronized with the PWM output, starts searching for a freewheeling time interval during which the main switch S1 and the single forward switch S2 are in the OFF state and the freewheeling switch S3 is in the ON state, and then after a small delay, typically in a few hundred nanoseconds, during the same or next freewheeling time intervals, the second tap switch Q2 is turned to the ON state. Thus, the turns ratio is increased to the value corresponding to the second voltage sub-range.

Tap switches Q1, ..., QN are controlled by the analog signal "$V_{in}$" and the pulse synchronization signal SYNC, similar to the other preferred embodiments described above. Only one tap switch corresponding to a specific sub-range is ON. At high input voltages, tap switch QN is in the ON state and tap switches Q1, ..., Q(N−1) are in the OFF state so that only the top section of the secondary winding of the power transformer T1 is activated and so that the turns ratio is set to the maximum ratio. Transition from one turns ratio to another turns ratio is preformed in a freewheeling time interval when energy flow from the input source is interrupted so that the primary and secondary currents are near zero, which results in a soft transition.

Figure 4A:
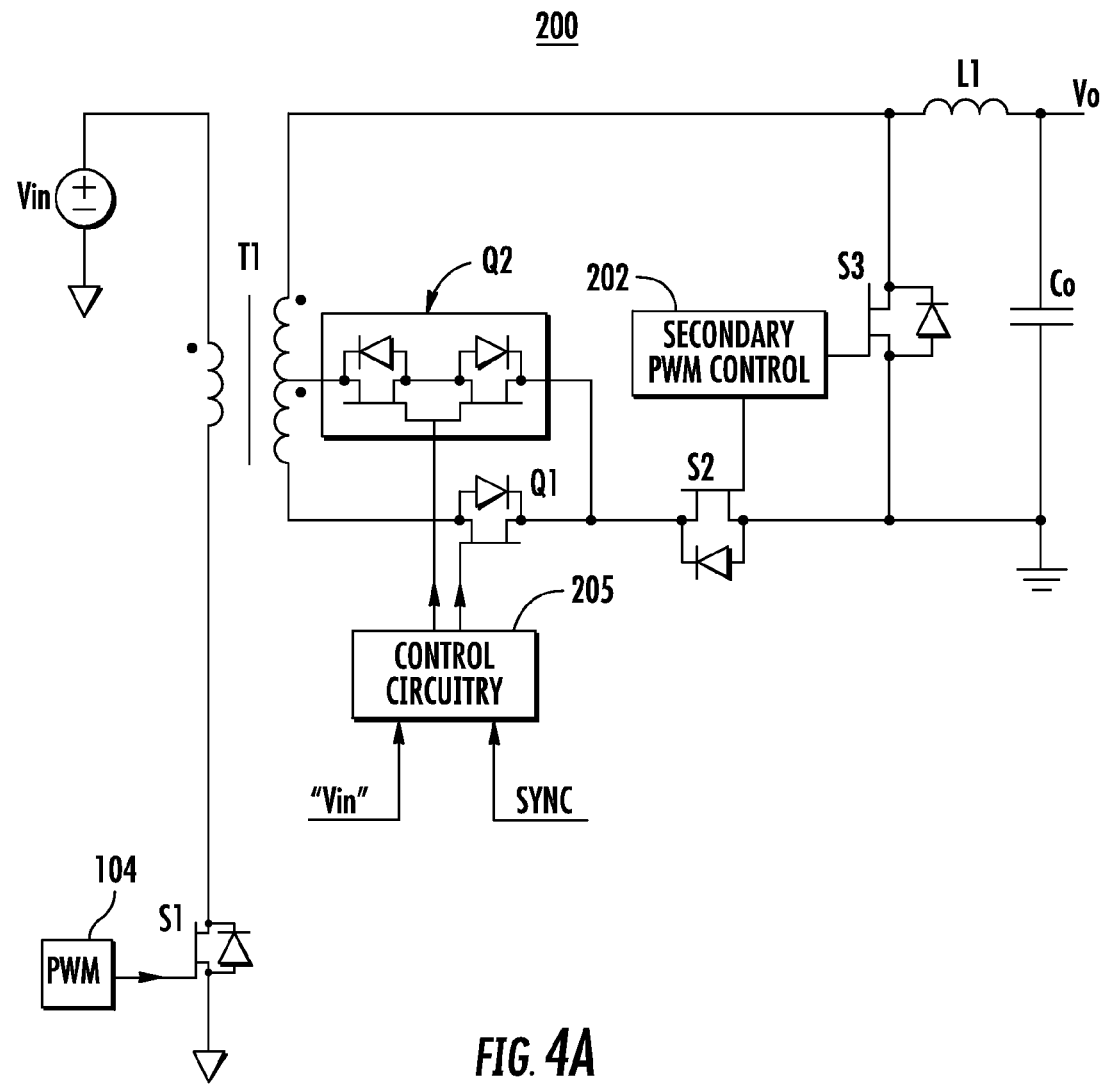
FIG. 4A shows a converter system according to a seventh preferred embodiment of the present invention that includes a forward converter with a single PWM controlled forward switch on the secondary side of the power transformer, a PWM controlled freewheeling MOSFET with a parallel diode, and two tap switches.

FIG. 4A shows a converter system according to a seventh preferred embodiment of the present invention. The converter system in this preferred embodiment uses a center tap modification of the converter system shown in FIG. 4 and includes the same components and has a similar principle of operation as the converter system shown in FIG. 4, with the difference that the power switch Q1 is preferably a single power MOSFET and the power switch Q2 is preferably a combination of two power MOSFETs with common sources and gates. Switches S1, S2, and S3 are also preferably power MOSFETs.

Figure 5:
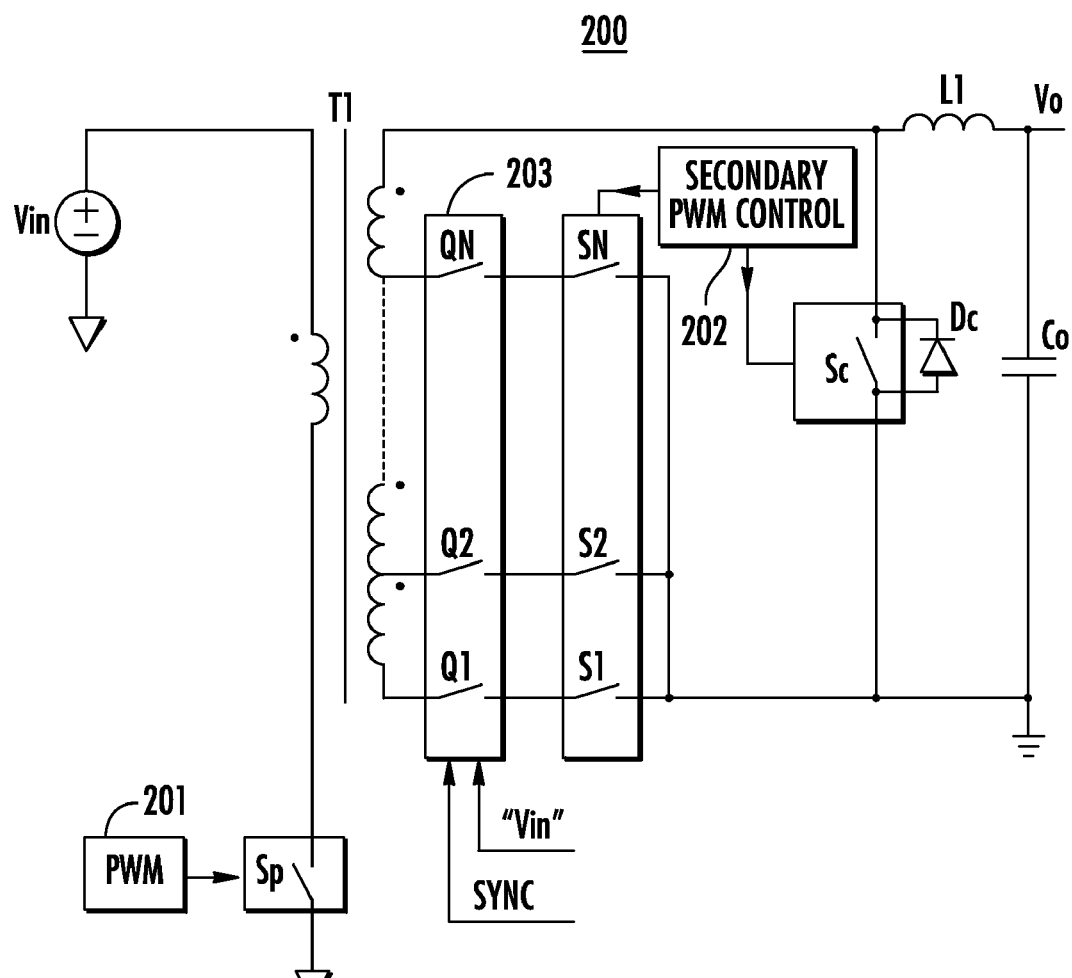
FIG. 5 shows a converter system according to an eighth preferred embodiment of the present invention that includes a forward converter with multiple PWM controlled forward switches on the secondary side of the power transformer, a single freewheeling switch with a parallel diode, and multiple tap switches that are controlled by the input voltage and a pulse signal synchronized with the PWM output.

FIG. 5 shows a converter system according to an eighth preferred embodiment of the present invention that includes a forward converter 200 with a main switch Sp on the primary side of the power transformer T1 that is controlled by the PWM 201, secondary forward switches S1, ..., SN, a secondary freewheeling (catch) switch Sc with an anti-parallel diode Dc, a secondary PWM control circuitry 202, tap switches Q1, ..., QN with a control circuitry 203, an output inductor L1, and an output capacitor Co. Each tap switch Qi (i=1, ..., N) is connected to the first terminal of the corresponding secondary forward switch Si; the second terminals of the forward switches Si are connected to the freewheeling switch Sc.

The converter system shown in FIG. 5 operates in a manner similar to the converter system shown in FIG. 4. Because in a specific input voltage sub-range, only one tap switch Qi is in the ON state and only one forward switch Si is operating, each forward switch Si can be optimized for that specific voltage sub-range, which improves efficiency of the converter system.

Figure 5A:
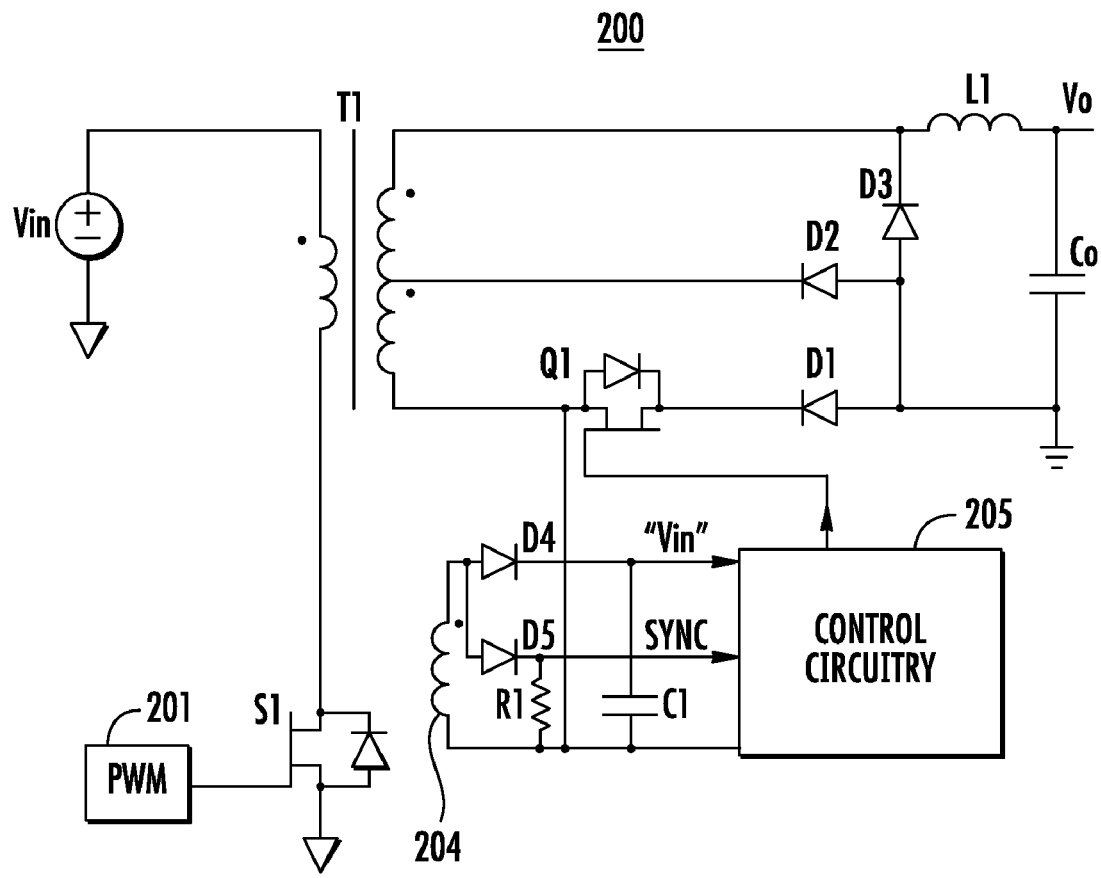
FIG. 5A shows a converter system according to a ninth preferred embodiment of the present invention that includes a forward converter with two forward diode rectifiers on the secondary side of the power transformer, and a one tap switch that is controlled by the input voltage and a pulse signal synchronized with the PWM output.

FIG. 5A shows a converter system according to a ninth preferred embodiment of the present invention. The converter system in this preferred embodiment uses a center tap modification with diode rectifiers of the converter system shown in FIG. 5 and includes a forward converter 200, a main switch S1 on the primary side of the power transformer T1 that is controlled by PWM 201, two forward diodes D1, D2, a freewheeling diode D3, a tap switch Q1, which is preferably an N-channel MOSFET, control circuitry 205, a signal secondary winding 204, two signal diode rectifiers D4, D5 that are connected to the first (dotted) terminal of the signal secondary winding 204, a resistor R1 that is connected to the diode D5 and to the second terminal of the signal secondary winding 204, a capacitor C1 that is connected to the diode D4 and to the second terminal of the signal secondary winding 204.

The analog signal "$V_{in}$" is derived from the peak charger of signal diode rectifier D4 and capacitor C1 that are connected to the signal secondary winding 204, which is in phase with the primary winding. The pulse synchronization signal SYNC is derived from the signal rectifier D4 and resistor R1. Alternatively, the analog signal "$V_{in}$" and the pulse synchronization signal SYNC can be derived from a signal winding coupled with the output inductor L1. Both techniques of deriving the analog signal "$V_{in}$" and the pulse synchronization signal SYNC can also be applied to the other preferred embodiments of the present invention. The converter system shown in FIG. 5A is a specific example of the converter system shown in FIG. 5. There is no difference in principle of operation.

Figure 5B:
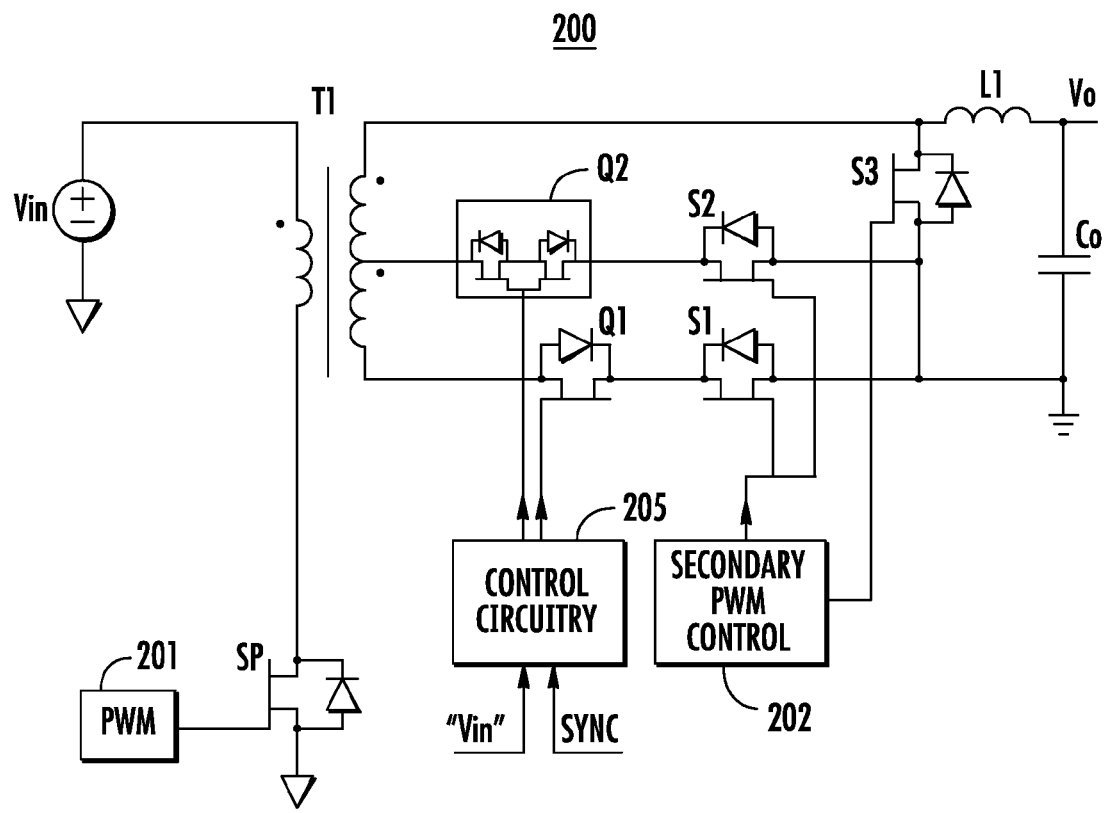
FIG. 5B shows a converter system according to a tenth preferred embodiment of the present invention that includes a forward converter with two PWM controlled forward n-channel MOSFETS on the secondary side of the power transformer, and two tap switches that are controlled by the input voltage and a pulse signal synchronized with the PWM output.

FIG. 5B shows a converter system according to a tenth preferred embodiment of the present invention. The converter system in this preferred embodiment uses a modification with synchronous rectification of the converter system shown in FIG. 5A and includes a forward converter 200, a main switch SP on the primary side of the power transformer T1 that is controlled by a PWM 201, two forward switches S1 and S2 that are preferably MOSFETs and that are controlled by a secondary PWM control 202, two tap switches Q1 and Q2 connected to control circuitry 205, an output inductor L1, and an output capacitor Co. The first tap switch Q1 is preferably a single power MOSFET, and the second tap switch Q2 is preferably a series combination of two power MOSFETs with common sources and gates. The converter system shown in FIG. 5B is a specific example of the converter systems shown in FIG. 5 and FIG. 5A and there is no difference in principle of operation.

Figure 5C:
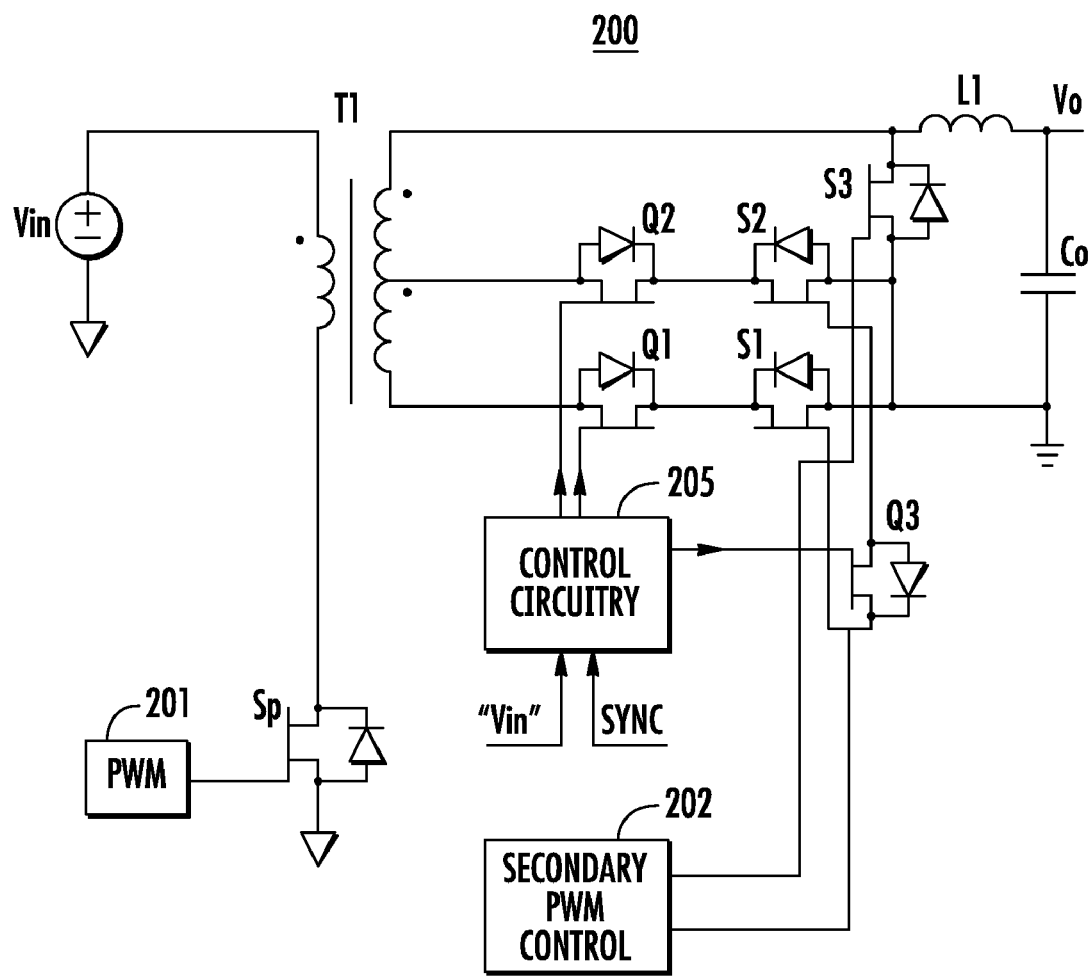
FIG. 5C shows a converter system according to an eleventh preferred embodiment of the present invention that includes a forward converter with two secondary forward n-channel MOSFETs on the secondary side of a power transformer, the power transformer with a center tap on the secondary side, two tap switches, and one low-power switch, the two switches and the one low-power switch are controlled by the input voltage and a pulse signal synchronized with the PWM output.

FIG. 5C shows a converter system according to an eleventh preferred embodiment of the present invention. The converter system in this preferred embodiment uses a modification with reduced number of power MOSFETs of the converter system shown in FIG. 5B and includes a signal switch Q3 that is preferably a MOSFET and that is controlled by control circuitry 205 and connected to the gate of forward switch S2 that is preferably a MOSFET. At low input voltages, signal switch Q3 and tap switch Q2 are in the OFF state that causes the forward switch S2 to be in the OFF state. The series combination of tap switch Q2 and forward switch S2 with the channels in OFF state and with "back-to-back" body diodes blocks the tap current at low input voltages and allows energy to flow through the closed tap switch Q1 and forward switch S1. The converter system shown in FIG. 5C is a specific example of the converter systems shown in FIG. 5B. There is no difference in principle of operation.

Figure 6:
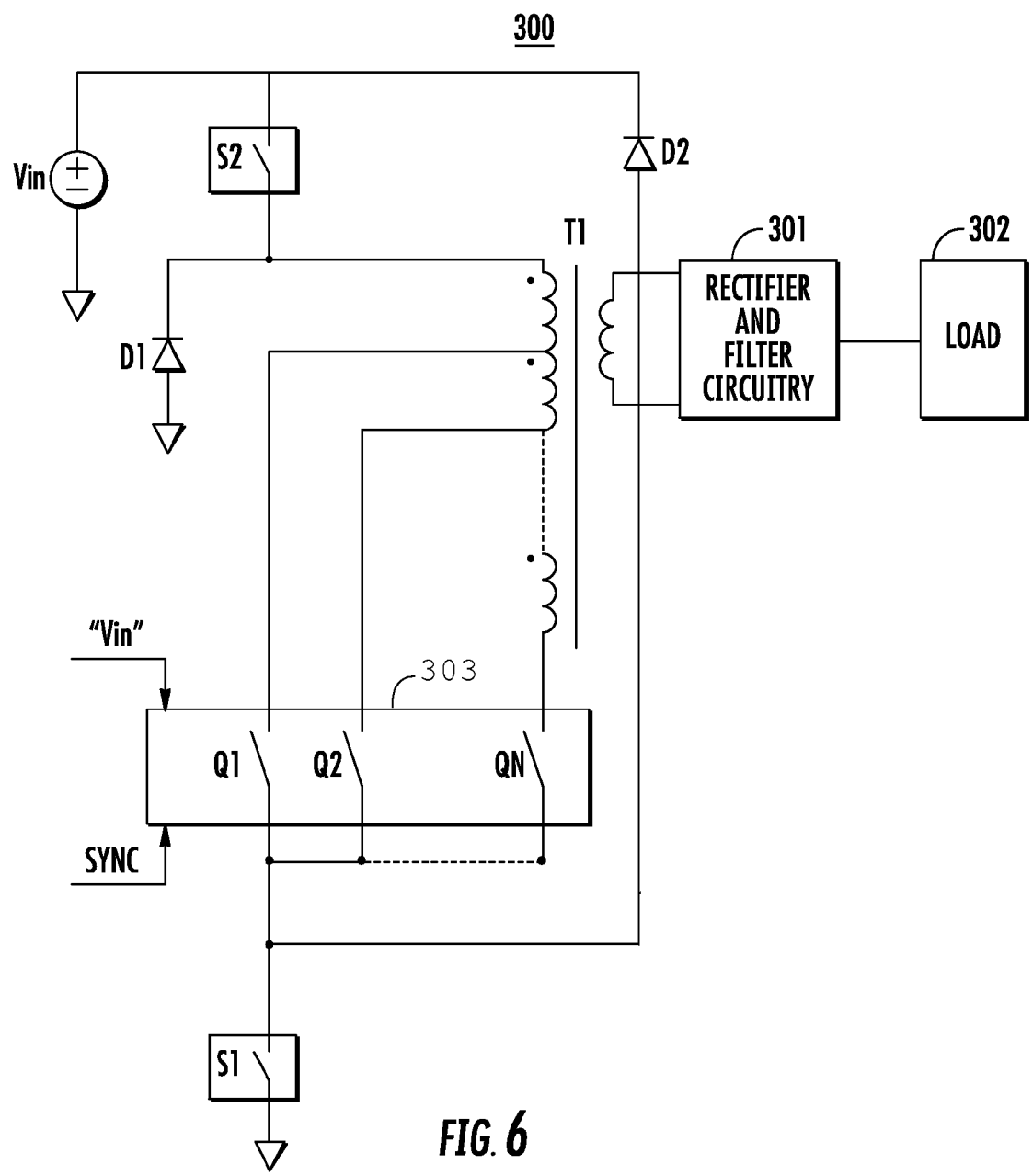
FIG. 6 shows a converter system according to a twelfth preferred embodiment of the present invention that includes a two switch forward converter with a single PWM main switch controlled by a low-side main switch and multiple tap switches on the primary side of the power transformer that are controlled by the input voltage and a pulse signal synchronized with the PWM output.

FIG. 6 shows a converter system according to a twelfth preferred embodiment of the present invention that includes a two switch forward converter 300 with a low side switch S1 and a high side switches S2 that are controlled by a PWM (not shown), two clamp diodes D1 and D2, a power transformer T1, tap switches Q1, ..., QN that are controlled through the control circuitry 303 by the analog signal "$V_{in}$" that is proportional to the input signal $V_{in}$ and by the pulse synchronization signal SYNC that is synchronized with the PWM output, a rectifier and filter circuitry 301, and load 302. The main switches S1, S2, the clamp diodes D1, D2, the power transformer T1, the rectifier and filter circuitry 301, and the load 302 are connected in a two switch forward topology. Tap switches Q1, ..., QN are connected to the taps of the primary winding of the power transformer T1 and to the main switch S1 in a s similar way as in the converter system shown in FIG. 2. The principle of operation of the tap switches Q1, ..., QN in FIG. 2 and FIG. 6 are similar.

Figure 7:
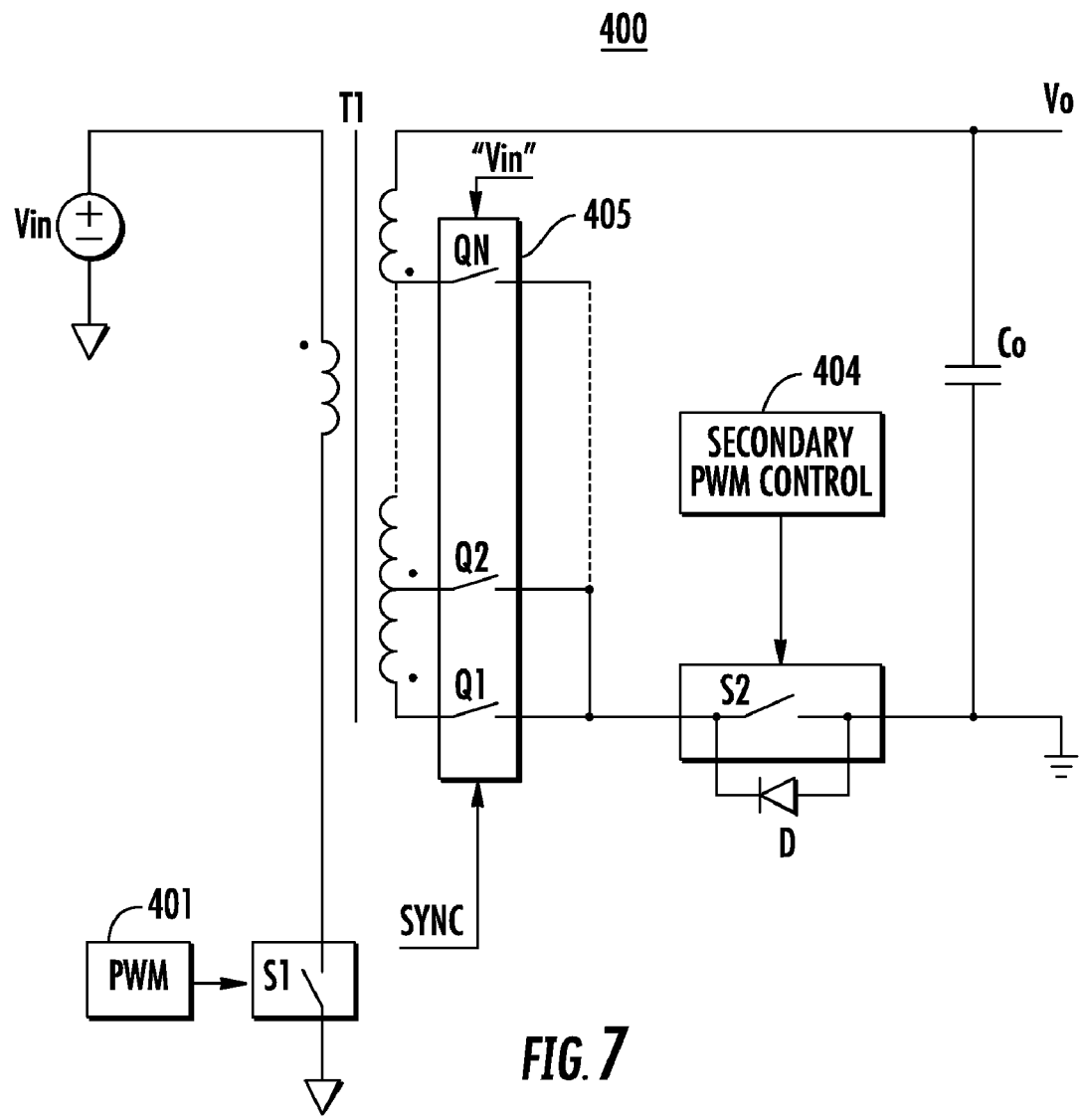
FIG. 7 shows a converter system according to a thirteenth preferred embodiment of the present invention that includes a flyback converter with single PWM controlled switch in parallel with a diode rectifier on the secondary side of the power transformer and multiple tap switches that are controlled by the input voltage and a pulse signal synchronized with the PWM output.

FIG. 7 shows a converter system according to a thirteenth preferred embodiment of the present invention that includes a flyback converter 400 with a main switch S1 on the primary side of the power transformer T1, a PWM 401, a single PWM controlled secondary rectifier switch S2 with a parallel diode rectifier D, tap switches Q1, ..., QN that are connected to the secondary winding taps of the power transformer T1 and to the secondary rectifier switch S2 in a similar arrangement as shown in FIG. 4. The tap switches Q1, ..., QN of the power transformer T1 are controlled through the control circuitry 405 by the analog signal "$V_{in}$" and by the pulse synchronization signal SYNC, as similarly shown in FIG. 4, except that the transition from one to another input voltage sub-range is performed in a time interval corresponding to the ON state of main switch S1, when the secondary rectifier switch S2 is in the OFF state, diode D is reverse biased, and the current in secondary winding is near zero.

Figure 8:
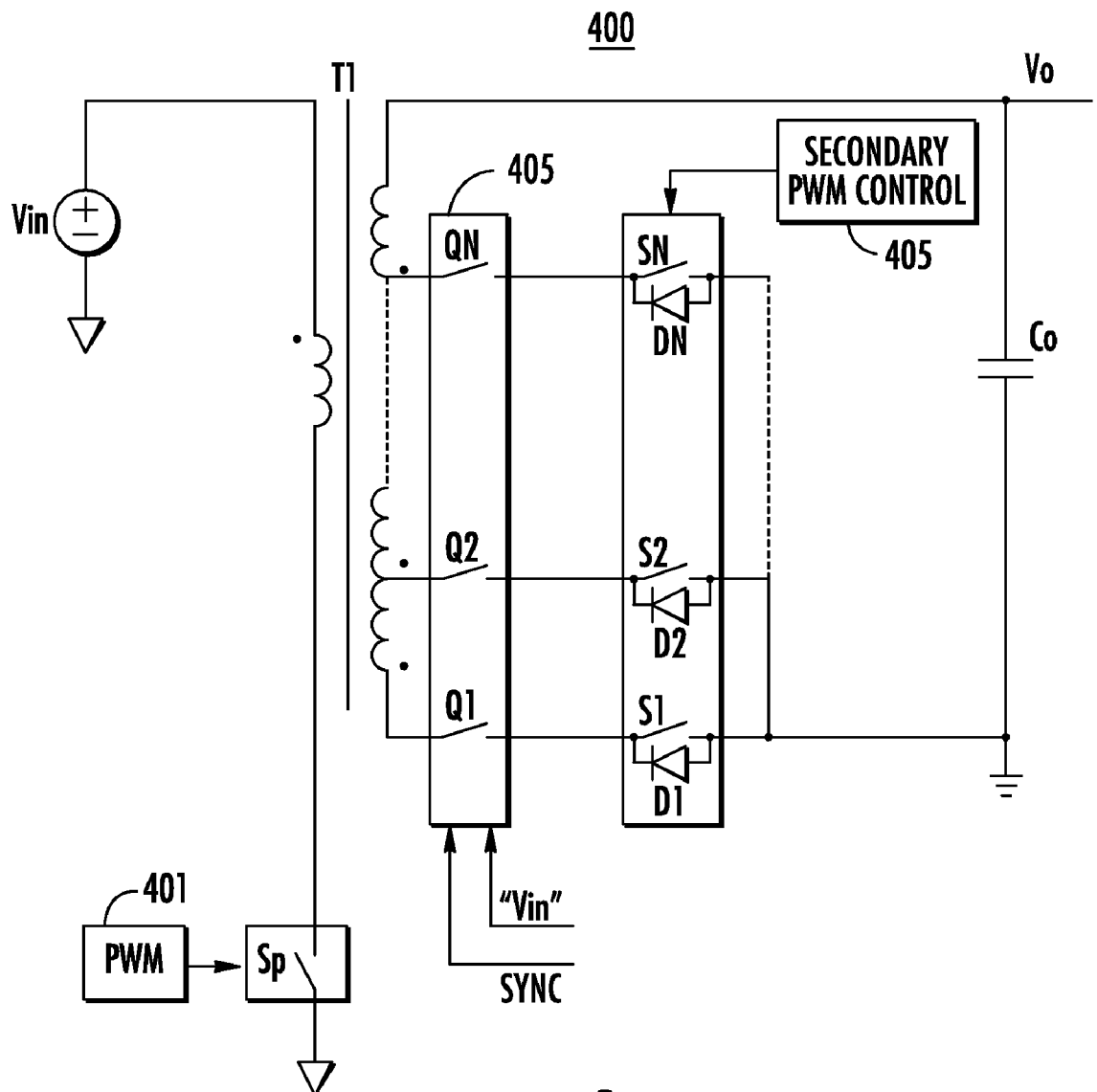
FIG. 8 shows a converter system according to a fourteenth preferred embodiment of the present invention that includes a flyback converter with multiple PWM controlled switches in parallel with diode rectifiers and multiple tap switches that are controlled by the input voltage and a pulse signal synchronized with the PWM output on the secondary side of the power transformer.

FIG. 8 shows a converter system according to a fourteenth preferred embodiment of the present invention that includes a flyback converter 400 having a main switch Sp on the primary side of the power transformer T1 that is controlled by a PWM 401, multiple tap switches Q1, ..., QN that are controlled through control circuitry 405 by the analog signal "$V_{in}$" and by the pulse synchronization signal SYNC, multiple PWM controlled switches S1, ..., SN in parallel with diode rectifiers D1, ..., DN on the secondary side of the power transformer T1, and an output capacitor Co. Each tap switch Qi (i=1, ..., N) is connected in series with a corresponding PWM controlled switch Si in a similar arrangement to that shown in FIG. 5. The tap switches Q1, ..., QN are controlled by the analog signal "$V_{in}$" and by the pulse synchronization signal SYNC in a similar manner as shown in FIG. 7.

Figure 9:
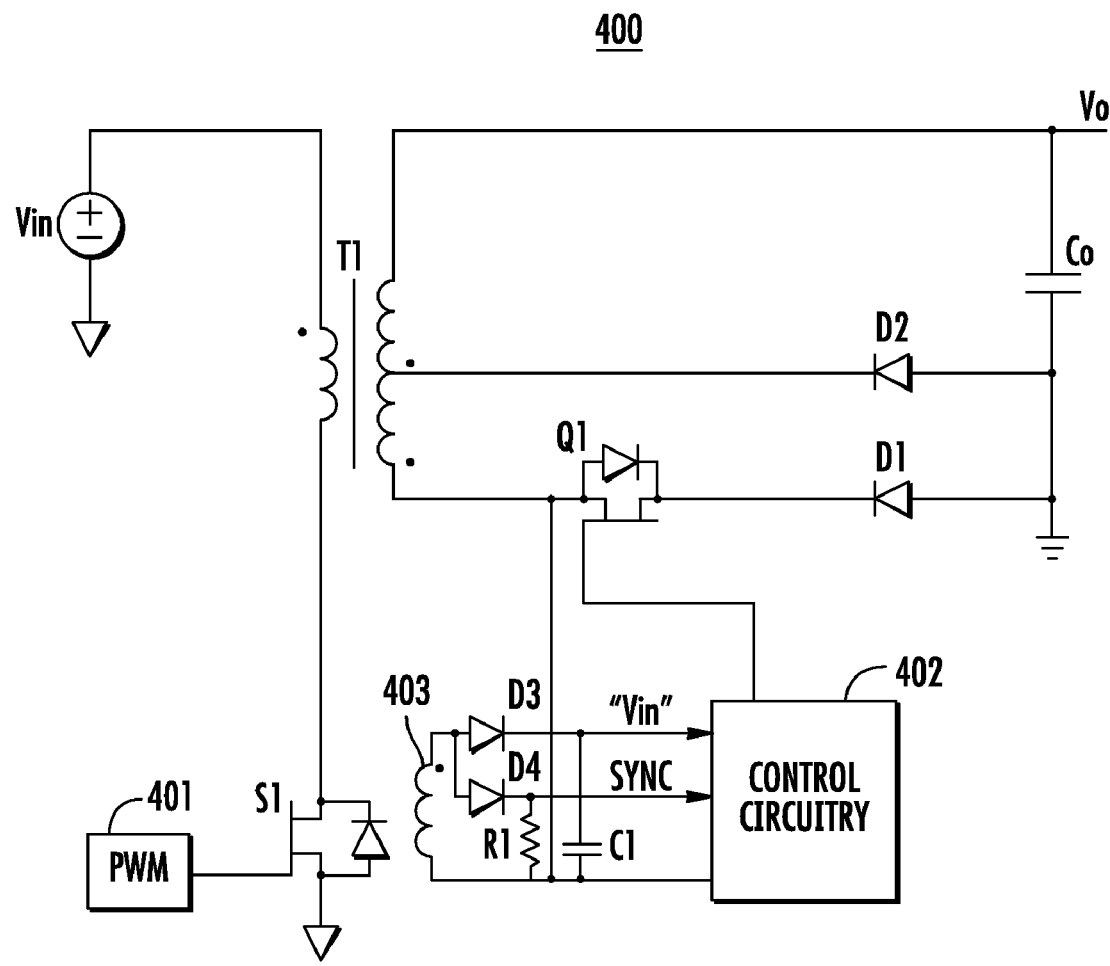
FIG. 9 shows a converter system according to a fifteenth preferred embodiment of the present invention that includes a flyback converter with two diode rectifiers on the secondary side of the power transformer and one tap switch that is controlled by the input voltage and a pulse signal synchronized with the PWM output.

FIG. 9 shows a converter system according to a fifteenth preferred embodiment of the present invention. The converter system in this preferred embodiment uses a center tap modification with diode rectification of the converter system shown in FIG. 8 and includes a flyback converter 400 with a single main switch S1 on the primary side of the power transformer T1 controlled by PWM 401, two diode rectifiers D1, D2, tap switch Q1 that is preferably a power MOSFET, control circuitry 402, a signal winding 403, connected to the rectifying diodes D3, D4 in the forward direction, a resistor R1 that is connected to the diode D4 and to the signal winding 403, a capacitor C1 that is connected to the rectifying diode D3 and the signal winding 403. Rectifying diodes D3, D4 are simultaneously ON with the ON state of the main switch S1. The flyback converter 400 in FIG. 9 operates in a similar manner as shown in FIG. 8. The analog signal "$V_{in}$" and the pulse synchronization signal SYNC are derived from the signal winding 403 in a similar manner as shown in FIG. 5A.

Figure 10:
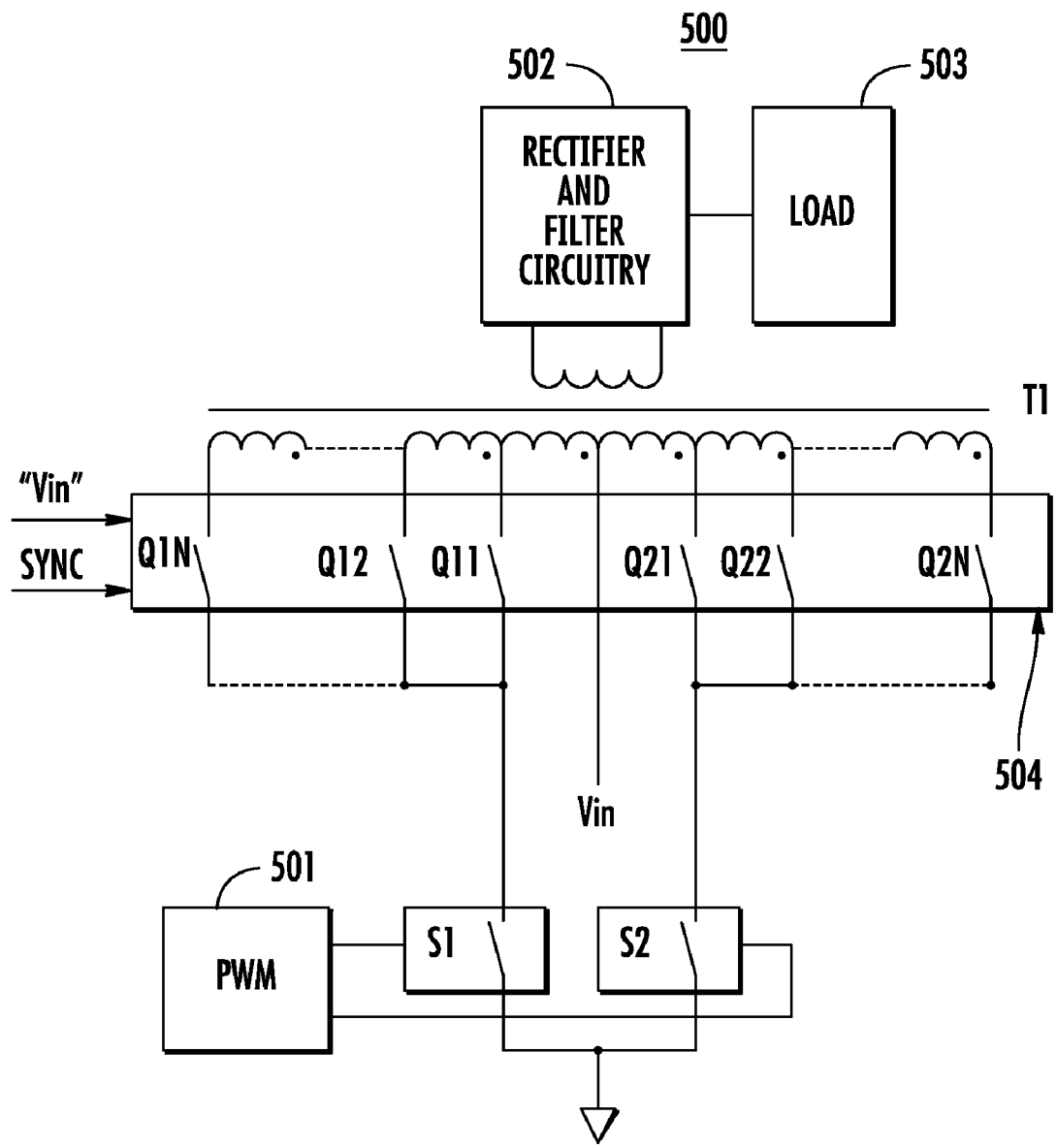
FIG. 10 shows a converter system according to a sixteenth preferred embodiment of the present invention that includes a push-pull converter with two PWM controlled main switches and multiple tap switches that are controlled by the input voltage and a pulse signal synchronized with the PWM output on the primary side of the power transformer.

FIG. 10 shows a converter system according to a sixteenth preferred embodiment of the present invention that includes a push-pull converter 500 with two main switches S1, S2 on the primary side of the power transformer T1 that are controlled by a PWM 501, two sets of tap switches Q11, ..., Q1N and Q21, ..., Q2N that are all controlled through the control circuit 504 by the analog signal "$V_{in}$" and by the pulse synchronization signal SYNC and that are connected to the primary winding taps of the power transformer T1 and to the corresponding main switches S1 and S2, rectifier and filter circuitry 502, and load 503.

The control circuitry 504 works in the following manner. At low input voltages, only the tap switches Q11 and Q21 are in the ON state and all of the other tap switches Q12, ..., Q1N, Q22, ..., Q2N are in the OFF state. As a result, the turns ratio of the power transformer T1 is set at the minimum ratio at low input voltages. As the input voltage crosses the borderline between the first and the second sub-ranges, the control circuitry 504, based on the pulse synchronization signal SYNC that is synchronized with the PWM output, starts searching for a time interval corresponding to the dead time when both of the main switches S1 and S2 are in the OFF state and generates a control signal first switching the tap switches Q11 and Q21 to the OFF state and then switching the tap switches Q12 and Q22 to the ON state after a small delay during the same or the next dead time interval. Commutation from any other voltage sub-range to the next voltage sub-range is performed in a similar way. Because during the dead time interval energy flow from the input source to the load is interrupted (load current is supplied by the output filter), the primary winding of the power transformer only carries a small magnetizing current, which results in a soft (near zero current) transition. As in the other preferred embodiments, the duty cycle at the low end of each voltage sub-range is automatically set at the maximum achievable level, the minimum pulse width is extended, the voltage stress on secondary side and the RMS current on primary side are reduced at high (and nominal) input voltages, which results in a greater efficiency of the converter system.

Figure 11:
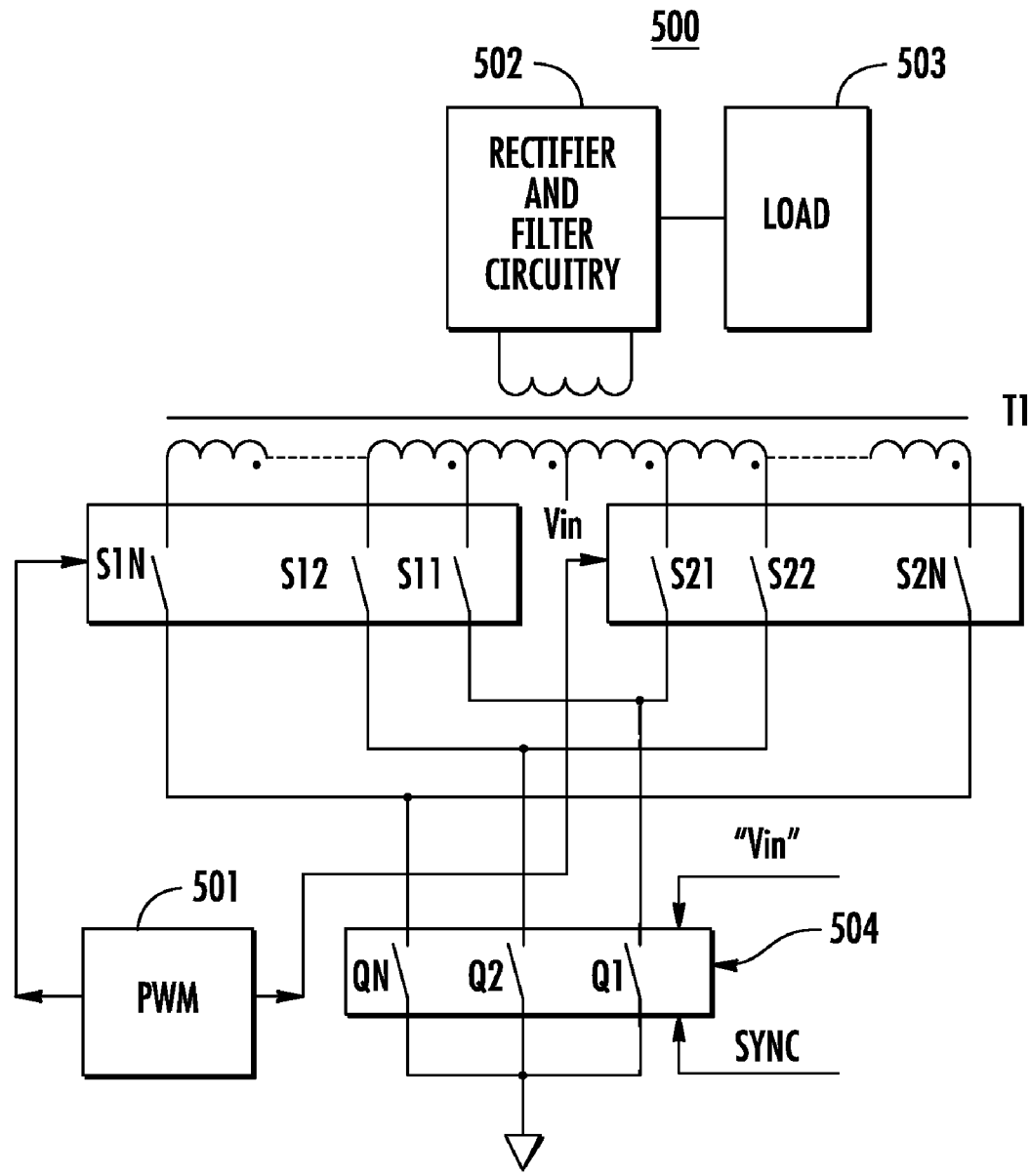
FIG. 11 shows a converter system according to a seventeenth preferred embodiment of the present invention that includes a push-pull converter with multiple PWM controlled main switches and multiple tap switches that are controlled by the input voltage and a pulse signal synchronized with the PWM output on the primary side of the power transformer.

FIG. 11 shows a converter system according to a seventeenth preferred embodiment of the present invention that includes a push-pull converter 500 with two sets of main switches S11, . . . , S1N and S21, . . . , S2N that are connected to the primary winding taps of the power transformer T1 and that are controlled by a PWM 501, one set of tap switches Q1, . . . , QN that are connected to the corresponding pairs of main switches S11, . . . , S1N and S21, . . . , S2N (i.e., tap switch Q1 is connected to main switches S11 and S21, tap switch Q2 is connected to main switches S12 and S22, . . . , and QN is connected to main switches S1N and S2N), rectifier and filter circuitry 502, and a load 503 on secondary side of the power transformer T1.

The control circuitry works 504 in the following manner. At low input voltages, only the tap switch Q1 is in the ON state, and all of the other tap switches Q2, . . . , QN are in the OFF state. As a result, the turns ratio of the power transformer T1 is set at the minimum ratio at low input voltages. As the input voltage crosses the borderline between the first and the second sub-ranges, the control circuitry 504, based on the pulse synchronization signal SYNC that is synchronized with the PWM output, starts searching for a time interval corresponding to the dead time when both of the main switches S11 and S21 are in the OFF state and generates a control signals that first switches the tap switch Q1 to the OFF state and then switches the tap switch Q2 to the ON state after a small delay during the same or next dead time interval. Commutation from any voltage sub-range to the next voltage sub-range is performed in a similar manner as discussed above. Because during the dead time interval the energy flow from the input source to the load 503 is interrupted (load current is supplied by the output filter), the primary winding of the power transformer T1 only carries a small magnetizing current, which results in a soft (near zero current) transition from one turns ratio to another turns ratio.

Figure 12:
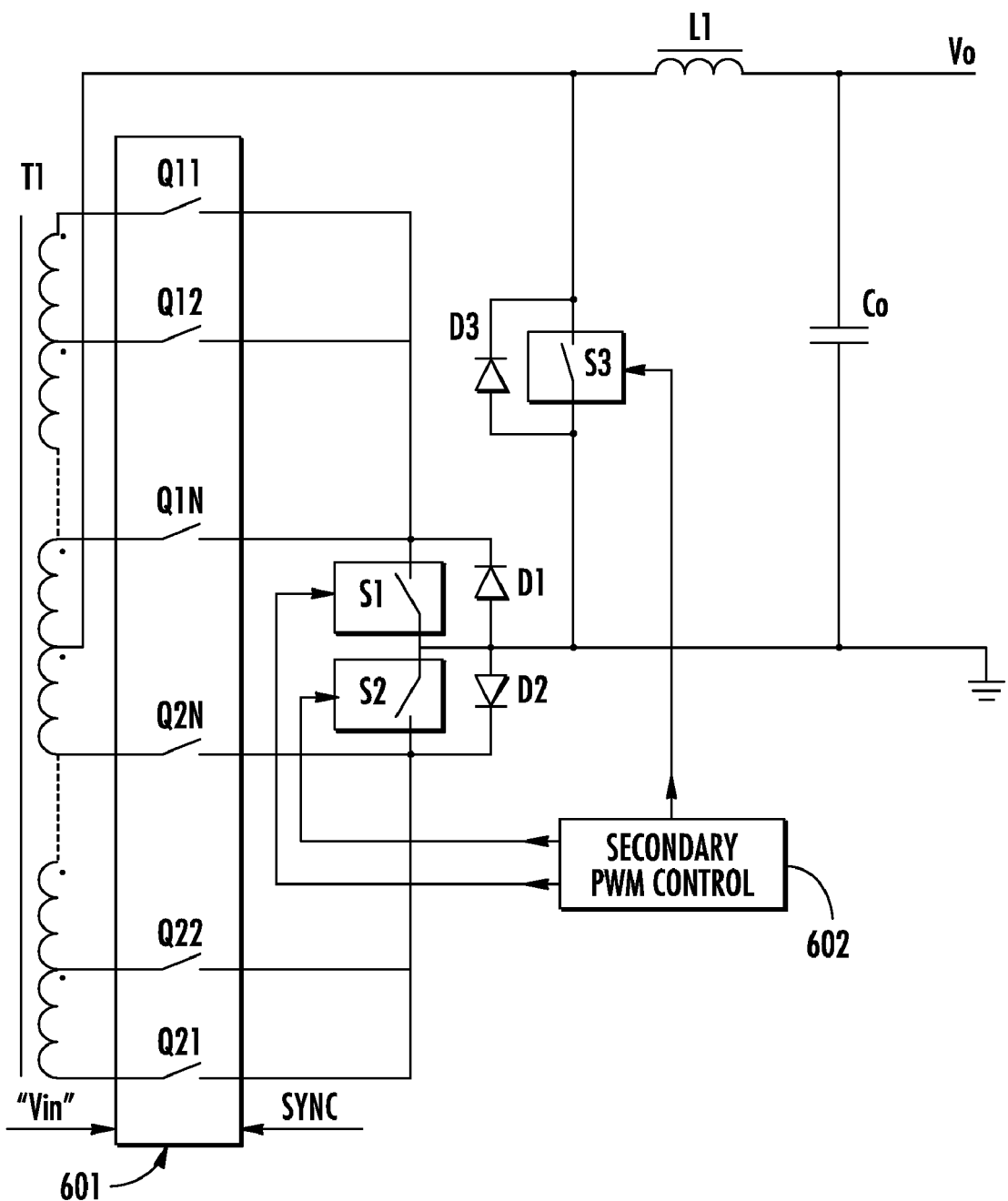
FIG. 12 shows a converter system according to an eighteenth preferred embodiment of the present invention that includes a converter with a center tap secondary rectifier circuit with two main PWM controlled secondary rectifiers, and multiple tap switches that are controlled by the input voltage and a pulse signal synchronized with the PWM output.

FIG. 12 shows a converter system according to an eighteenth preferred embodiment of the present invention that includes a converter having a center tap rectifier circuitry 600 at the secondary side of power transformer T1 with two PWM controlled main switches S1 and S2, two rectifying diodes D1 and D2 that are connected in parallel to the main switches S1 and S2, respectively, a PWM controlled freewheeling switch S3 with a parallel diode D3, two sets of tap switches Q11, . . . , Q1N and Q21, . . . , Q2N, an output inductor L1, and an output capacitor Co. The first set of tap switches Q11, . . . , Q1N are connected to the taps of the top winding section of the power transformer T1 and to the main switch S1, and the second set of switches Q21, . . . , Q2N are connected to the taps of the bottom winding section of the power transformer T1 and to the main switch S2.

The converter system of this preferred embodiment operates in the following manner. At low input voltages, tap switches Q11 and Q21 are in the ON state, the full secondary winding is connected to the main switches S1 and S2, and the turns ratio is set to the minimum ratio. As the input voltage crosses the borderline between the first and the second sub-ranges, the control circuitry 601, based on the pulse synchronization signal SYNC that is synchronized with the PWM output, starts searching for a dead time interval during which energy flow from the primary source is interrupted (load current is supplied by the inductor L1 through the freewheeling switch S3 and the diode D3) and generates a control signal that first switches the tap switches Q11 and Q21 to the OFF states and that then switches tap switches Q12 and Q22 to the ON state after a small delay during the same or the next dead time interval. Commutation from any voltage sub-range to the next voltage sub-range is preformed in a similar manner.

Figure 13:
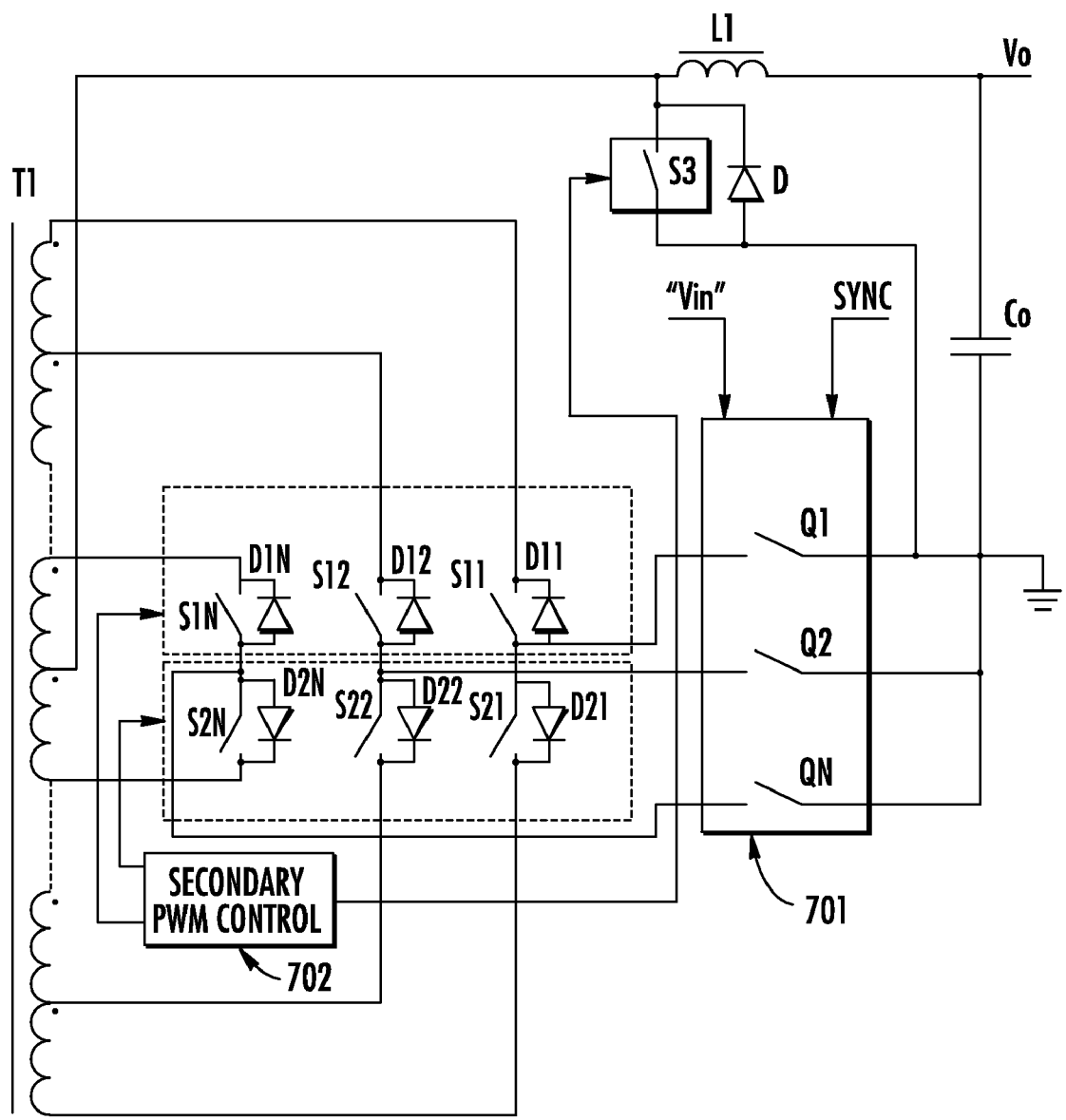
FIG. 13 shows a converter system according to a nineteenth preferred embodiment of the present invention that includes a converter with a center tap secondary rectifier with multiple PWM controlled secondary main rectifiers and multiple tap switches that are controlled by the input voltage and a pulse signal synchronized with the PWM output.

FIG. 13 shows a converter system according to an nineteenth preferred embodiment of the present invention that includes a converter having a center tap rectifier circuitry 700 at the secondary side of power transformer T1 having two sets of PWM controlled main switches S11, . . . , S1N and S21, . . . , S2N with corresponding parallel rectifying diodes D11, . . . , D1N and D21, . . . , D2N, a PWM controlled freewheeling switch S3 with a parallel diode D, tap switches Q1, . . . , QN with control circuitry 701, an output inductor L1, and an output capacitor Co. Each tap switch Qi (i=1, . . . , N) is connected to the output return and to the common terminals of the main switches S1i and S2i.

The converter having a center tap rectifier circuitry 700 operates in the following manner. At low input voltages, the switch Q1 is in the ON state, the full secondary winding of the power transformer T1 is connected to the main switches S11 and S21, and turns ratio is set at the minimum ratio. As the input voltage crosses the borderline between the first and the second sub-ranges, the control circuitry 701, based on the pulse synchronization signal SYNC that is synchronized with the PWM output, starts searching for a dead time interval during which energy flow from the primary source is interrupted (load current is supplied by the inductor L1 through the freewheeling switch S3 and the diode D) and generates a control signal that first switches tap switch Q1 to the OFF state and then switches the tap switch Q2 to the ON state after a small delay during the same or next dead time interval. A soft transition from any voltage sub-range to the next voltage sub-range is performed in a similar manner. In each input voltage sub-range, only one of the tap switches Qi is conducting.

Figure 14:
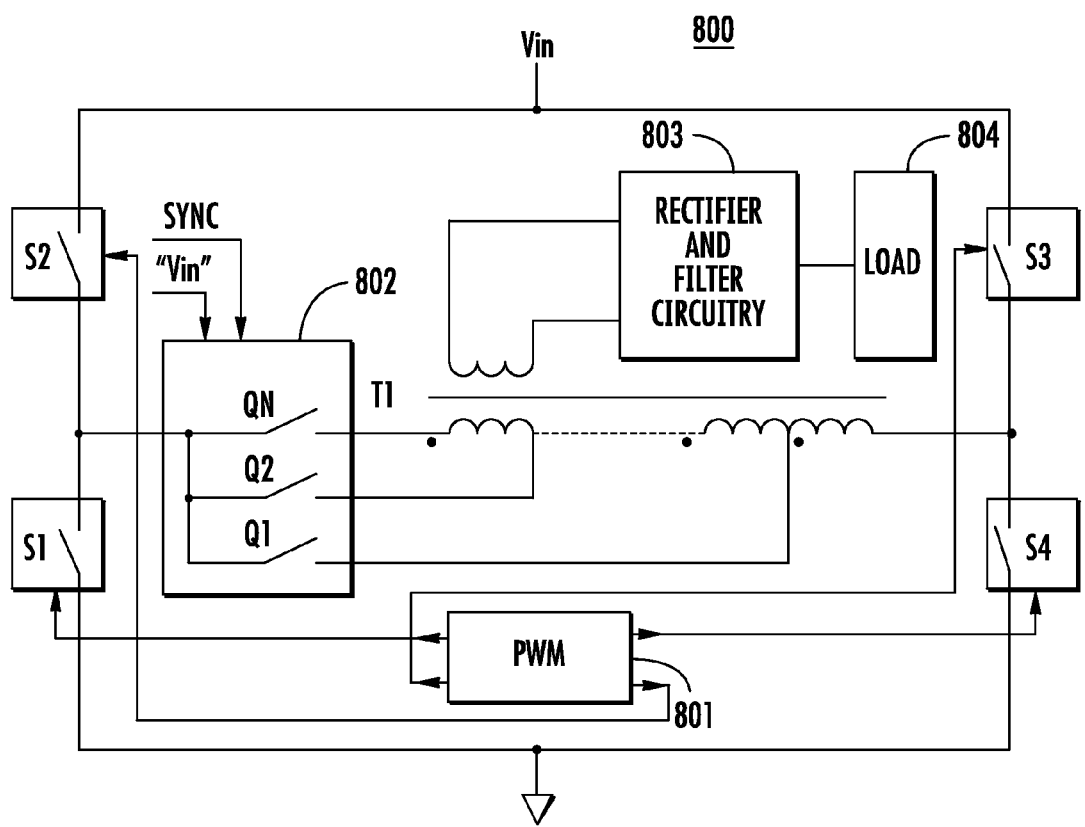
FIG. 14 shows a converter system according to a twentieth preferred embodiment of the present invention that includes a full-bridge converter with four PWM controlled main switches and multiple tap switches that are controlled by the input voltage and a pulse signal synchronized with the PWM output on the primary side of the power transformer.

FIG. 14 shows a converter system according to a twentieth preferred embodiment of the present invention that includes a full-bridge converter 800 with four main switches S1, . . . , S4, controlled by a PWM 801, tap switches Q1, . . . , QN connected to control circuitry 802 on the primary side of the power transformer T1, rectifier and filter circuitry 803, and a load 804.

The tap switches Q1, . . . , QN operate in the following manner. At low input voltages, the tap switch Q1 is in the ON state, the other tap switch Q2, . . . , QN are in the OFF state, only the right hand section of the primary winding in FIG. 14 is connected to the diagonal of the full bridge, and the turns ratio is set at the minimum ratio. As the input voltages crosses the borderline between the first and the second voltage sub-ranges, the control circuitry 802, based on the pulse synchronization signal SYNC that is synchronized with the PWM output, starts searching for a dead time interval corresponding to the OFF states of main switches S1, . . . , S4 and generates a control signal that first switches the tap switch Q1 to the OFF state and that then switches the tap switch Q2 to the ON state after a small delay during the same or next dead time interval. The transition from any voltage sub-range to the next voltage sub-range is performed in a similar manner. Because during the dead time interval energy flow from the input source to the load 804 is interrupted (load current is supplied by the output filter), the primary winding of the power transformer T1 only carries a small magnetizing current, which results in a soft (near zero current) transition from one turns ratio to another turns ratio.

Figure 15:
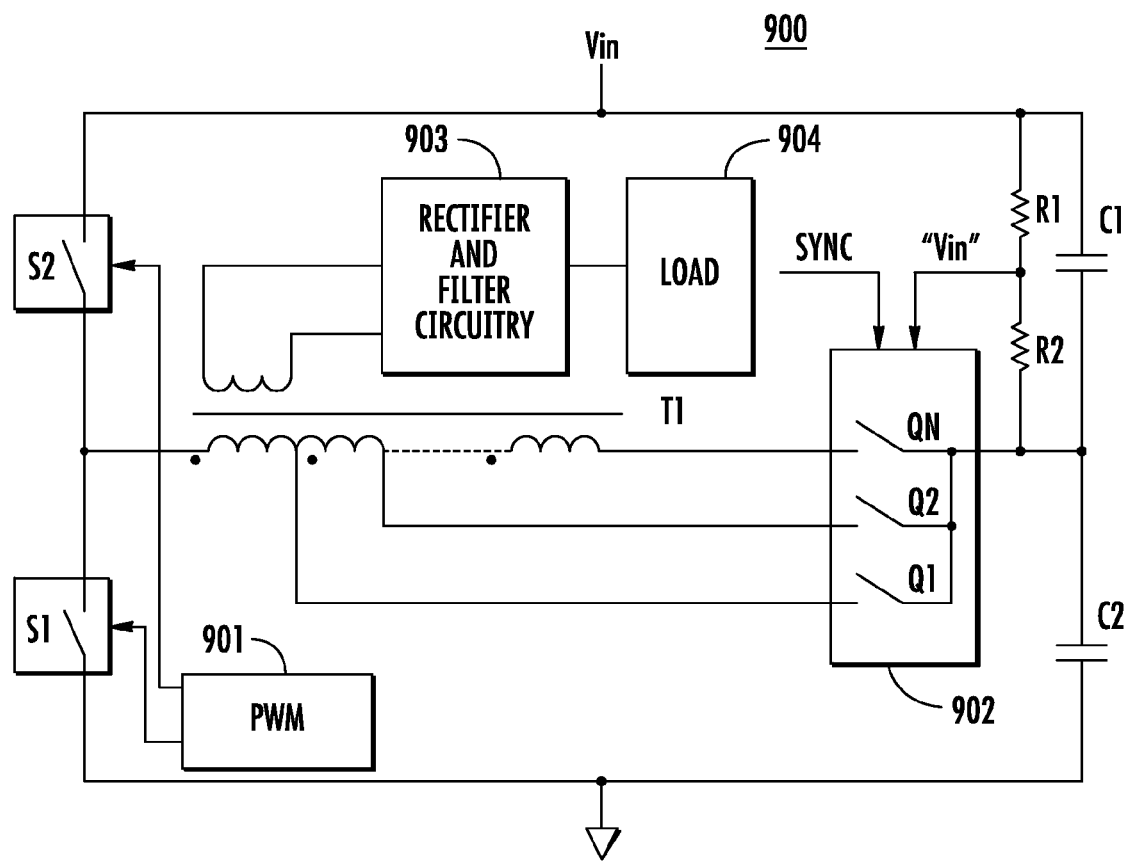
FIG. 15 shows a converter system according to a twenty first preferred embodiment of the present invention that includes a half-bridge converter with two PWM controlled main switches and multiple tap switches that are controlled by the input voltage and a pulse signal synchronized with the PWM output on the primary side of the power transformer.

FIG. 15 shows a converter system according to a twenty first preferred embodiment of the present invention that includes a half-bridge converter 900 with two main switches S1, S2 on the primary side of the power transformer T1 that are controlled by a PWM 901, tap switches Q1, ..., QN connected to control circuitry 902, capacitors C1, C2 arranged as a capacitive divider, resistors R1, R2 arranged as a resistive divider that is connected in parallel to the capacitor C1, rectifier and filter circuitry 903, and a load 904. The main switches S1, S2, the windings of the power transformer T1, the capacitors C1, C2 arranged as the capacitive divider, the rectifier and filter circuitry 903, and the load 904 are connected as shown in FIG. 15. The tap switches Q1, ..., QN are connected between the taps of the primary winding of the power transformer T1 and the mid-point between the capacitors C1, C2. The analog signal "$V_{in}$" is derived from the resistors R1, R2.

The tap switches Q1, ..., QN operate in the following manner. At low input voltages, the tap switch Q1 is in the ON state, the other switches Q2, ..., QN are in the OFF state, only the left hand section of the primary winding of the power transformer T1 in FIG. 15 is connected to the mid-point between the main switches S1, S2 and the mid-point between the capacitors C1, C2, and the turns ratio is set at the minimum ratio. As the input voltage crosses the borderline between the first and the second sub-ranges, the control circuitry 802, based on the pulse synchronization signal SYNC that is synchronized with the PWM output, starts searching for a dead time interval corresponding to the OFF state of main switches S1, S2 and generates control signals that first switch the tap switch Q1 to the OFF state and that then switch the tap switch Q2 to the ON state after a small delay during the same or next dead time interval. Transition from any other voltage sub-range to the next one is performed in much the same fashion. Because during the dead time interval energy flow from the input source to the load is interrupted (load current is supplied by the output filter), the primary winding of the power transformer T1 only carries a small magnetizing current resulting in a soft (near zero current) transition from one turns ratio to another turns ratio.

Figure 16:
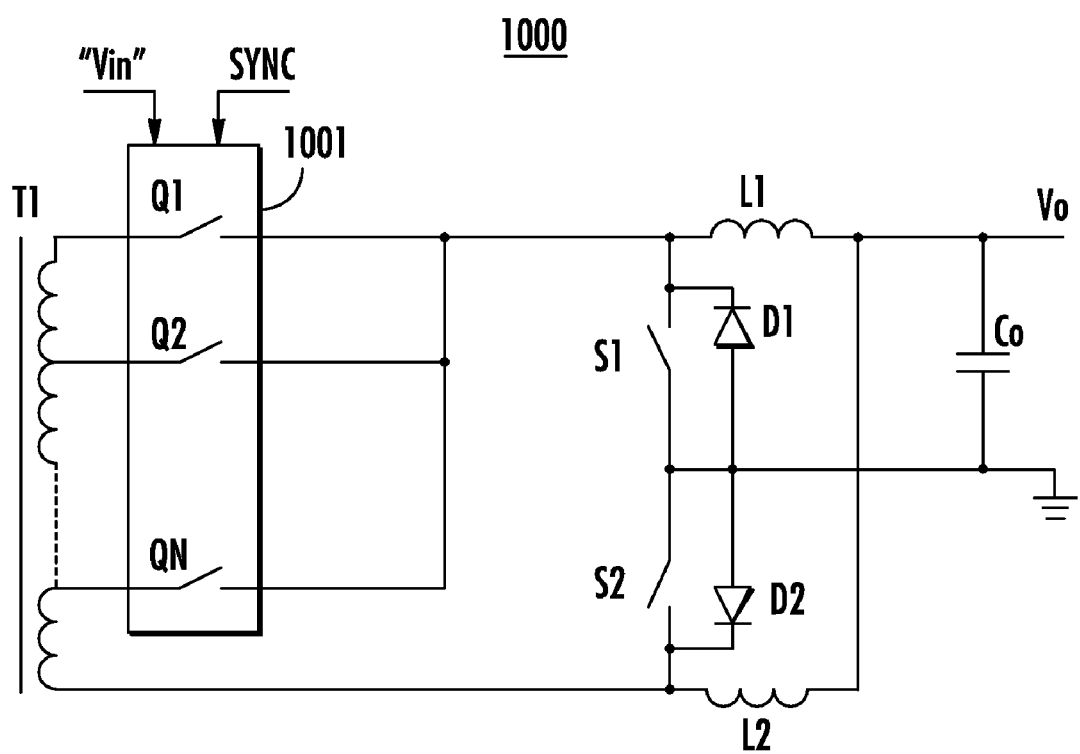
FIG. 16 shows a converter system according to a twenty second preferred embodiment of the present invention that includes a converter with a current doubler secondary rectifier with two PWM controlled secondary rectifiers and multiple tap switches that are controlled by the input voltage and a pulse signal synchronized with the PWM output.

FIG. 16 shows a converter system according to a twenty second preferred embodiment of the present invention that includes a converter having a current doubler rectifier 1000 on the secondary side of the power transformer T1 with two rectifier switches S1, S2 that are controlled by a secondary PWM circuitry (not shown), two diodes D1, D2 that are connected in parallel to the rectifier switches S1 and S2, respectively, tap switches Q1, ..., QN connected to control circuitry 1001, two output inductors L1, L2, and an output capacitor Co. The secondary winding of the power transformer T1, the rectifier switches S1, S2, the diodes D1, D2, the inductors L1, L2, and the capacitor Co are connected as shown in FIG. 16. Tap switches Q1, ..., QN are connected between the secondary winding taps and the connection point of one of the rectifier switch S1 and the inductor L1.

The tap switches Q1, ..., QN operate in the following manner. At low input voltages, the tap switch Q1 is in the ON state, the other tap switches Q2, ..., QN are in the OFF state, the full secondary winding of the power transformer T1 is connected to the rectifier circuitry, and the turns ratio is set to the minimum ratio. As the input voltage crosses the borderline between the first and the second sub-ranges the control circuitry 1001, based on the pulse synchronization signal SYNC that is synchronized with the PWM output, starts searching for a dead time interval corresponding to a near zero current in the windings of the power transformer T1 and generates a control signal that first switches the tap switch Q1 to the OFF state and that then switches the tap switch Q2 to the ON state after a small delay during the same or next dead time interval. The transition from any other voltage sub-range to the next voltage sub-range is performed in a similar manner.

Figure 17:
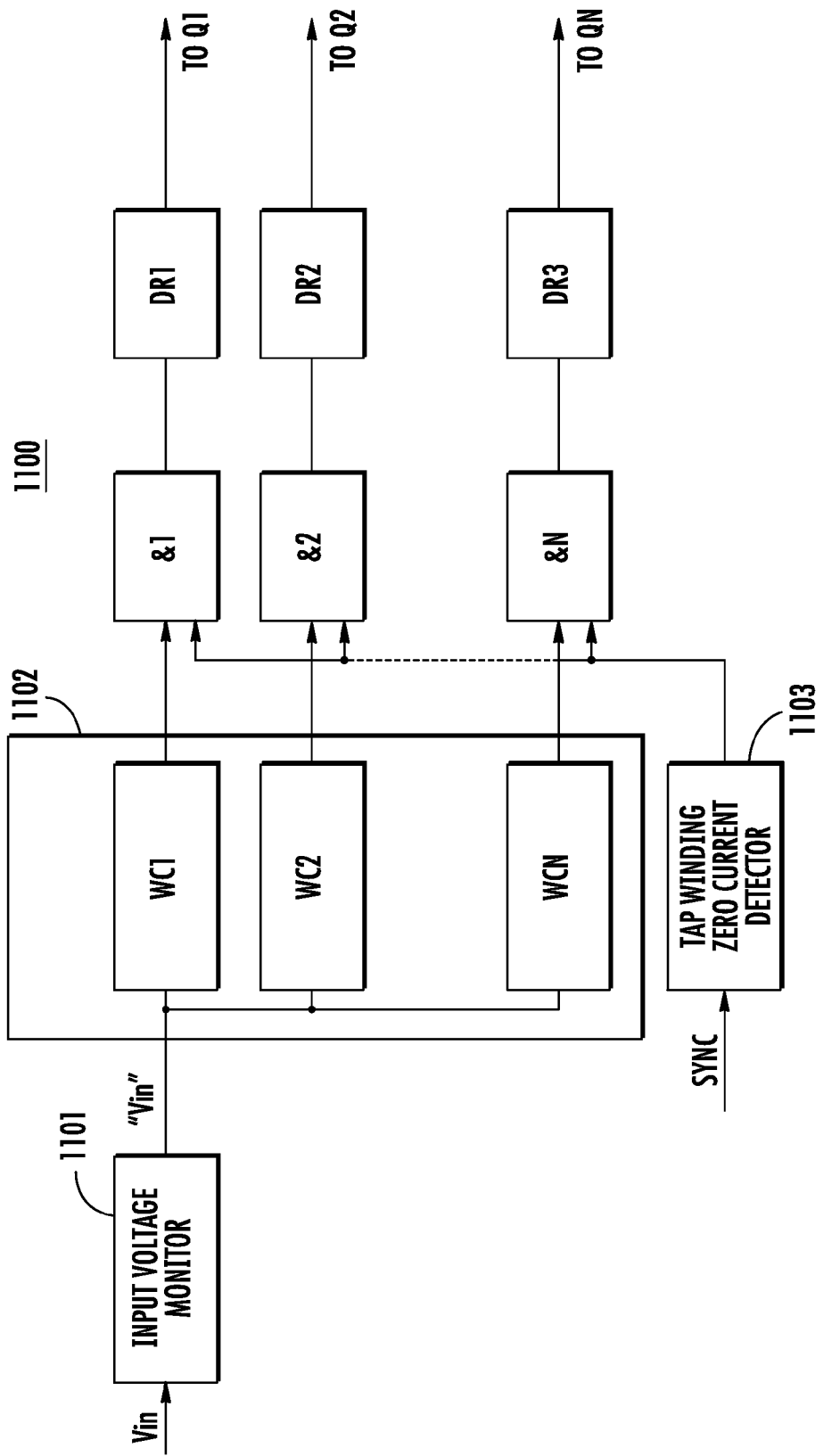
FIG. 17 shows a block diagram of a control circuit according to the twenty third preferred embodiment of the present invention.

FIG. 17 shows a block diagram of the control circuit 1100 according to a twenty third preferred embodiment of the present invention. The control circuit 1100 is used to control the tap switches Q1, ..., QN. The control circuit 1100 includes an input voltage monitor 1101 that receives the input signal $V_{in}$ and that is connected to an input voltage range monitor 1102 that has window comparators WC1, WC2, ..., WCN, tap winding zero current detector 1103 that receives the pulse synchronization signal SYNC synchronized with the PWM output, AND gates &1, ..., &N that are controlled by output of window comparator WC1, WC2, ..., WCN and by output of the current detector 1103, and tap switch drivers DR1, ..., DRN that are controlled by the output of the AND gates &1, ..., &N and that is connected to the switches control inputs.

The control circuit 1100 operates in the following manner. The input voltage monitor 1101 generates an analog "$V_{in}$" signal that is proportional to the input voltage $V_{in}$ and, that is generally isolated from the input voltage $V_{in}$. The input voltage monitor 1101 can include, for example, a signal winding with a peak charger as shown in FIG. 5A, can include a voltage divider as shown in FIG. 15, can include an optocoupler circuit (not shown), or can include other suitable voltage monitoring circuits.

One of the window comparators WC1, WC2, ..., WCN of the input voltage range monitor 1102 generates a high output level when the input voltage is within a specific input voltage sub-range, while the other window comparators WC1, WC2, ..., WCN generate low outputs for input voltages in that specific voltage sub-range. The tap winding zero current detector 1103 generates a high output level in the time intervals corresponding to the near zero current in the tap winding.

The tap winding zero current detector 1103 preferably is based on current measurement circuitry or is based on a SYNC signal analyzer that is programmed depending on the circuit topology used. For example, for forward topology, the SYNC signal analyzer could generate a HIGH output level in the freewheeling time intervals, for push-pull and other double-ended topologies, the SYNC signal analyzer could generate a HIGH output level in the dead time intervals. One of the AND gates &1, ..., &N generates a HIGH output level if and only if a corresponding window comparator's output is HIGH and the tap winding zero current detector 1103 generates a HIGH output, which indicates a zero or near zero current condition in the tap winding. The AND gate &1, ..., &N that generates the HIGH output level excites the corresponding tap switch driver DR1, ..., DRN and consequently the corresponding tap switch turns on. Only one of the tap switches Q1, ..., QN is ON in a specific $V_{in}$ sub-range.

Each of the above-described preferred embodiments include rectifying circuitry that is used to output DC power. However, it is also possible to not include any rectifying circuitry so that AC power is outputted instead of DC power. Depending on the specific application, either DC power or AC power can be outputted.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A power conversion system comprising:
an input terminal that is arranged to be connected to a voltage source;
a transformer having a first winding connected to the input terminal and a second winding connected to an output terminal of the power conversion system, either the first winding or the second winding is provided with at least three taps that are arranged to divide the first winding or the second winding into at least two sub-windings;
at least one tap switch connected to the at least two sub-windings;
a control circuit connected to the at least one tap switch; and
at least one switch connected to the at least one tap switch; wherein
the control circuit is arranged to control the at least one tap switch to control a turn ratio of the transformer based on a voltage level provided by the voltage source.

2. A power conversion system according to claim 1, wherein the at least one switch is connected to each of the at least one tap switch.

3. A power conversion system according to claim 1, wherein the at least one tap switch includes a plurality of tap switches, and the at least one switch includes a plurality of switches that are each connected to a corresponding one or corresponding ones of the plurality of tap switches.

4. A power conversion system according to claim 1, wherein the at least one tap switch is connected between the transformer and the at least one switch.

5. A power conversion system according to claim 1, wherein the at least one switch is connected between the transformer and the at least one tap switch.

6. A power conversion system according to claim 1, wherein the at least one tap switch is connected to the second winding, and one of the at least one switches is connected to the first winding.

7. A power conversion system according to claim 1, wherein the control circuit is arranged to receive an input signal that is based on the voltage level provided by the voltage source and to receive a synchronization signal that is synchronized with an output signal of a pulse modulator.

8. A power conversion system according to claim 7, further comprising a signal secondary winding that provides the input signal that is based on an input voltage.

9. A power conversion system according to claim 1, wherein the at least one tap switch includes at least two tap switches, and when the current through the at least two windings is zero or near zero, the control circuit is arranged to first turn off one of the at least two tap switches and then to later turn on another of the at least two tap switches to control the turn ratio of the transformer.

10. A power conversion system according to claim 1, wherein the at least one switch is a MOSFET.

11. A power conversion system according to claim 1, wherein the at least one tap switch is a MOSFET.

12. A power conversion system according to claim 1, wherein the at least one tap switch is a series combination of two MOSFETs with common sources and gates.

13. A power conversion system according to claim 1, further comprising a diode connected to a center tap of the second winding.

14. A power conversion system according to claim 1, further comprising a switch connected between the input terminal and the transformer.

15. A power conversion system according to claim 1, wherein the input terminal is connected to a center tap of the first winding.

16. A power conversion system according to claim 1, wherein the output terminal is connected to a center tap of the second winding.

17. A power conversion system according to claim 1, wherein the control circuit includes at least one window comparator that determines which voltage sub-range that an input voltage is in.

18. A power conversion system according to claim 1, wherein the control circuit includes a tap winding zero current detector.

19. A power conversion system according to claim 1, wherein the at least one switch includes four switches arranged in a full-bridge arrangement.

20. A power conversion system according to claim 1, wherein the at least one switch includes two switches arranged in a half-bridge arrangement.

21. A power conversion system according to claim 1, further comprising a pulse modulator connected to the at least one switch.

22. A power conversion system according to claim 1, wherein the power conversion system supplies DC power.

23. A power conversion system according to claim 1, wherein the power conversion system supplies AC power.

* * * * *